(12) United States Patent
Hu et al.

(10) Patent No.: US 12,652,663 B2
(45) Date of Patent: Jun. 9, 2026

(54) ARCHITECTURE FOR TRANSMISSION INDICATION

(71) Applicant: ZTE Corporation, Shenzhen (CN)

(72) Inventors: Linxi Hu, Shenzhen (CN); Nan Zhang, Shenzhen (CN); Jianqiang Dai, Shenzhen (CN); Zhen Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 372 days.

(21) Appl. No.: 18/127,838

(22) Filed: Mar. 29, 2023

(65) Prior Publication Data

US 2023/0239865 A1 Jul. 27, 2023

Related U.S. Application Data

(63) Continuation of application No. PCT/CN2020/122046, filed on Oct. 20, 2020.

(51) Int. Cl.
| | |
|---|---|
| *H04L 1/18* | (2023.01) |
| *H04L 1/1812* | (2023.01) |
| *H04W 72/1263* | (2023.01) |
| *H04W 72/231* | (2023.01) |

(52) U.S. Cl.
CPC ....... *H04W 72/1263* (2013.01); *H04L 1/1812* (2013.01); *H04W 72/231* (2023.01)

(58) Field of Classification Search
CPC ..... H04L 1/1812; H04L 1/189; H04L 1/1896; H04L 1/1822; H04W 72/1263; H04W 72/231
See application file for complete search history.

(56) References Cited

U.S. PATENT DOCUMENTS

| | | | | |
|---|---|---|---|---|
| 2018/0196715 A1* | 7/2018 | Balasubramanian | ........................ | G06F 11/2097 |
| 2021/0050955 A1* | 2/2021 | Park | ..................... | H04B 7/0456 |
| 2021/0377912 A1* | 12/2021 | El Hamss | ............. | H04W 72/02 |
| 2021/0377999 A1* | 12/2021 | Yang | ..................... | H04W 72/23 |
| 2022/0007403 A1* | 1/2022 | Li | ........................... | H04W 72/20 |
| 2022/0007455 A1* | 1/2022 | Hong | ................ | H04W 74/0836 |
| 2022/0232613 A1* | 7/2022 | Gao | ....................... | H04L 1/1887 |
| 2023/0180269 A1* | 6/2023 | Li | ........................... | H04W 72/11 370/312 |
| 2023/0189255 A1* | 6/2023 | Bagheri | ................ | H04L 1/1812 370/329 |

(Continued)

FOREIGN PATENT DOCUMENTS

| | | |
|---|---|---|
| CN | 110710318 | 1/2020 |
| WO | WO2019/157669 | 8/2019 |
| WO | WO2019/217904 | 11/2019 |

OTHER PUBLICATIONS

International Search Report issued Jul. 8, 2021 in International (PCT) Application No. PCT/CN2020/122046.

(Continued)

*Primary Examiner* — Andrew Lee

(74) *Attorney, Agent, or Firm* — Crowell & Moring LLP

(57) ABSTRACT

A basestation (e.g., a gNodeB) may transmit transmission scheduling information (such as downlink control information) to user equipment (UE). The basestation may include repetition related parameters (such as repetition numbers, aggregation factors, or other repetition information) for transmission repetition control within the transmission scheduling information.

16 Claims, 5 Drawing Sheets

500

550

(56) References Cited

U.S. PATENT DOCUMENTS

2023/0269032 A1 * 8/2023 Park ..................... H04B 7/06
2023/0403702 A1 * 12/2023 Su ..................... H04L 1/1896

OTHER PUBLICATIONS

Huawei et al., "Discussion on HARQ Enhancement for NTN", R1-2005267, Aug. 8, 2020, Section 2.

Huawei et al: "Discussion on HARQ for NTN", 3GPP Draft; R1-1910065, 3rd Generation Partnership Project (3GPP), Mobile Competence Centre; 650, Route Des Lucioles; F-06921 Sophia-Antipolis Cedex; France vol. RAN WG1, No. Chongqing, China; Oct. 14, 2019-Oct. 20, 2019, Oct. 5, 2019 (Oct. 5, 2019), XP051808409, Retrieved from the Internet: URL:https://ftp.3gpp.org/tsg_ran/WG1_RL1/TSGR1_98b/Docs/R1-1910065.zip R1-1910065.docx [retrieved on Oct. 5, 2019] * p. 1 * * p. 3 *.

Lenovo et al: "Enhancements on HARQ for NTN", 3GPP Draft; R1-2005835, 3rd Generation Partnership Project (3GPP), Mobile Competence Centre; 650, Route Des Lucioles; F-06921 Sophia-Antipolis Cedex; France vol. RAN WG1, No. e-Meeting; Aug. 17, 2020-Aug. 28, 2020, Aug. 7, 2020 (Aug. 7, 2020), XP052347208, Retrieved from the Internet: URL:https://ftp.3gpp.org/tsg_ran/WG1_RL1/TSGR1_102-e/Docs/R1-2005835.zip R1-2005835.docx [retrieved on Aug. 7, 2020] * p. 2-p. 3 *.

* cited by examiner

350

Receive transmission scheduling information. 352

Obtain a repetition related parameter from transmission scheduling information. 354

300

Include a repetition related parameter in transmission scheduling information. 302

Transmit transmission scheduling information. 304

ARCHITECTURE FOR TRANSMISSION INDICATION

This application is a continuation application of PCT International Application No. PCT/CN2020/122046, filed with the China National Intellectual Property Administration, PRC on Oct. 20, 2020, which is herein incorporated by reference in its entirety.

TECHNICAL FIELD

This disclosure relates to an architecture for downlink channel information signaling response coordination.

BACKGROUND

Wireless communication technologies are moving the world towards a rapidly increasing network connectivity. High-speed and low-latency wireless communications rely on efficient network resource management and allocation between user mobile stations and wireless access network nodes (including but not limited to wireless base stations). Unlike traditional circuit-switched networks, efficient wireless access networks may not necessarily rely on dedicated user channels. Instead, wireless network resources (such as carrier frequencies and transmission time slots) for transmitting voice or other types of data from mobile stations to wireless access network nodes may be allocated using information transmitted on the channels themselves.

DETAILED DESCRIPTION

In various telecommunications systems, such as non-terrestrial networks (NTN) or other networks with high latency, the latency may cause transmission delay and affect system performance. In some cases, such as in existing 3GPP communication standards, the delay may be addressed in part by enabling or disabling hybrid automatic repeat request (HARQ) feedback for HARQ processes. In other words, if the transmission delay increases beyond defined measures, HARQ feedback may be disabled. Once feedback is disabled, the HARQ process can send information without waiting for HARQ feedback. However, if there is no HARQ feedback, the reliability of the data transmission will be reduced relative to a system where HARQ feedback is enabled because the sender may cease repetition before a data transmission has been successfully received by receiver.

In various systems, transmitting data repeatedly is an effective way to improve reliability. In the existing New Radio (NR) standards, the repetition number for the physical downlink shared channel (PDSCH) and/or physical uplink shared channel PUSCH are configured using the pdsch-AggregationFactor and the pusch-AggregationFactor through the radio resource control (RRC) layer. Once configured, PDSCH/PUSCH is transmitted in accordance with the repetition number until the configuration parameters are changed through the RRC layer (e.g., the next time an RRC Information Element (IE) is sent). In some cases, different repetition numbers are applicable to different channel conditions. For example, if the channel quality is good, a low repetition number may be used. If the channel quality is poor, a high repetition number may be used. Accordingly, dynamic adjustment of the number of repetitions in accordance with channel changes may improve the operation of the transmission hardware. However, the interval between RRC-layer reconfigurations may be large relative to the timescales over which the channel quality may vary. As recognized herein, reliance on reconfiguration of the repetition number at the RRC-layer may not necessarily provide a sufficiently dynamic response, when the channel quality is changing more rapidly than the RRC-layer can be reconfigured. As discussed herein, indication of the repetition number (or other repetition-related parameter) via the downlink channel information (DCI) or via other transmission scheduling information may provide more rapid configuration of repetition parameters (e.g., such as repetition number, aggregation factor, or other parameters). However, there is no bit field used to indicate the repetition number in the current DCI format of NR. Therefore, the PDSCH/PUSCH repetition number can be enhanced together with DCI to implement dynamic indication of the repetition number.

Figure 1:
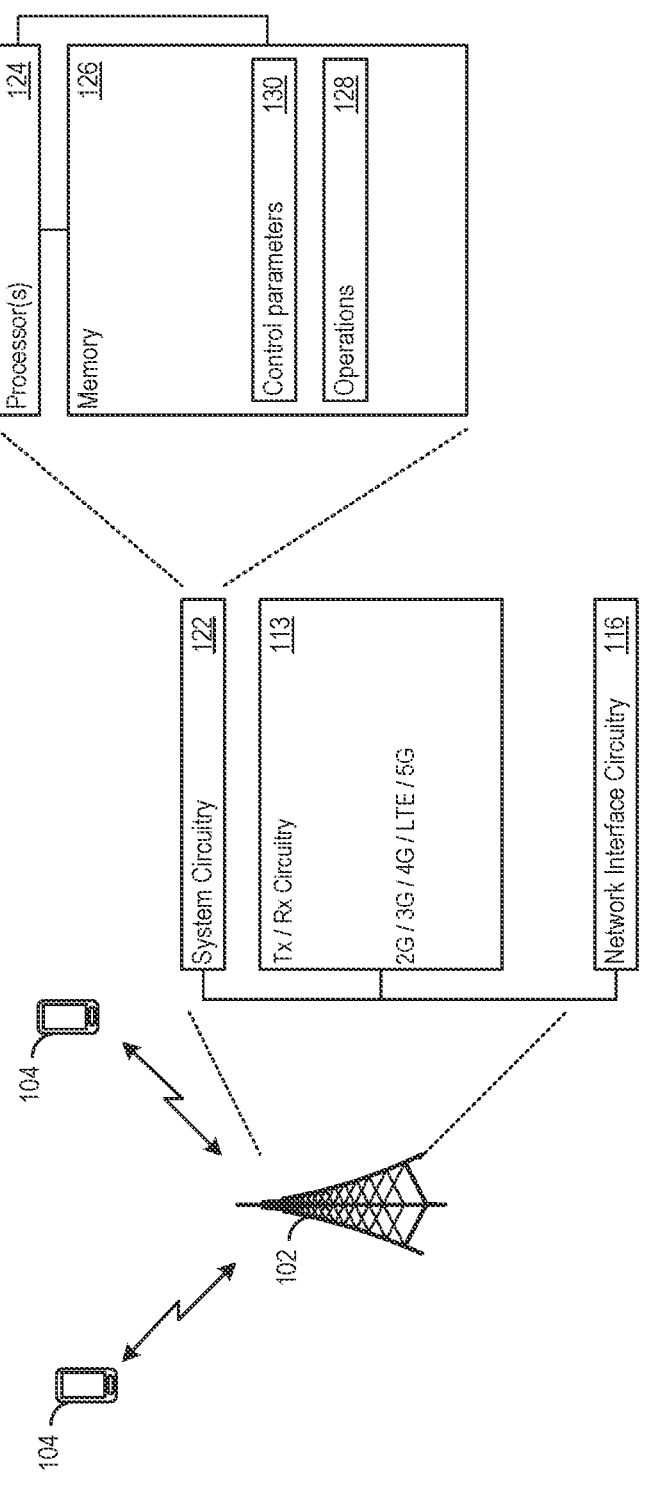
FIG. 1 shows an example basestation.

FIG. 1 shows an example basestation 102. The example basestation (e.g., a gNodeB (gNB)) may include radio Tx/Rx circuitry 113 to receive and transmit with UEs 104. The basestation may also include network interface circuitry 116 to couple the basestation to the core network 110, e.g., optical or wireline interconnects, Ethernet, and/or other data transmission mediums/protocols.

The basestation may also include system circuitry 122. System circuitry 122 may include processor(s) 124 and/or memory 126. Memory 126 may include operations 128 and control parameters 130. Operations 128 may include instructions for execution on one or more of the processors 124 to support the functioning the basestation. For example, the operations may handle DCI transmission to a UE. The control parameters 130 may include parameters or support execution of the operations 128. For example, control parameters may include network protocol settings, DCI format rules, repetition parameter rules, bandwidth parameters, radio frequency mapping assignments, and/or other parameters.

Figure 2:
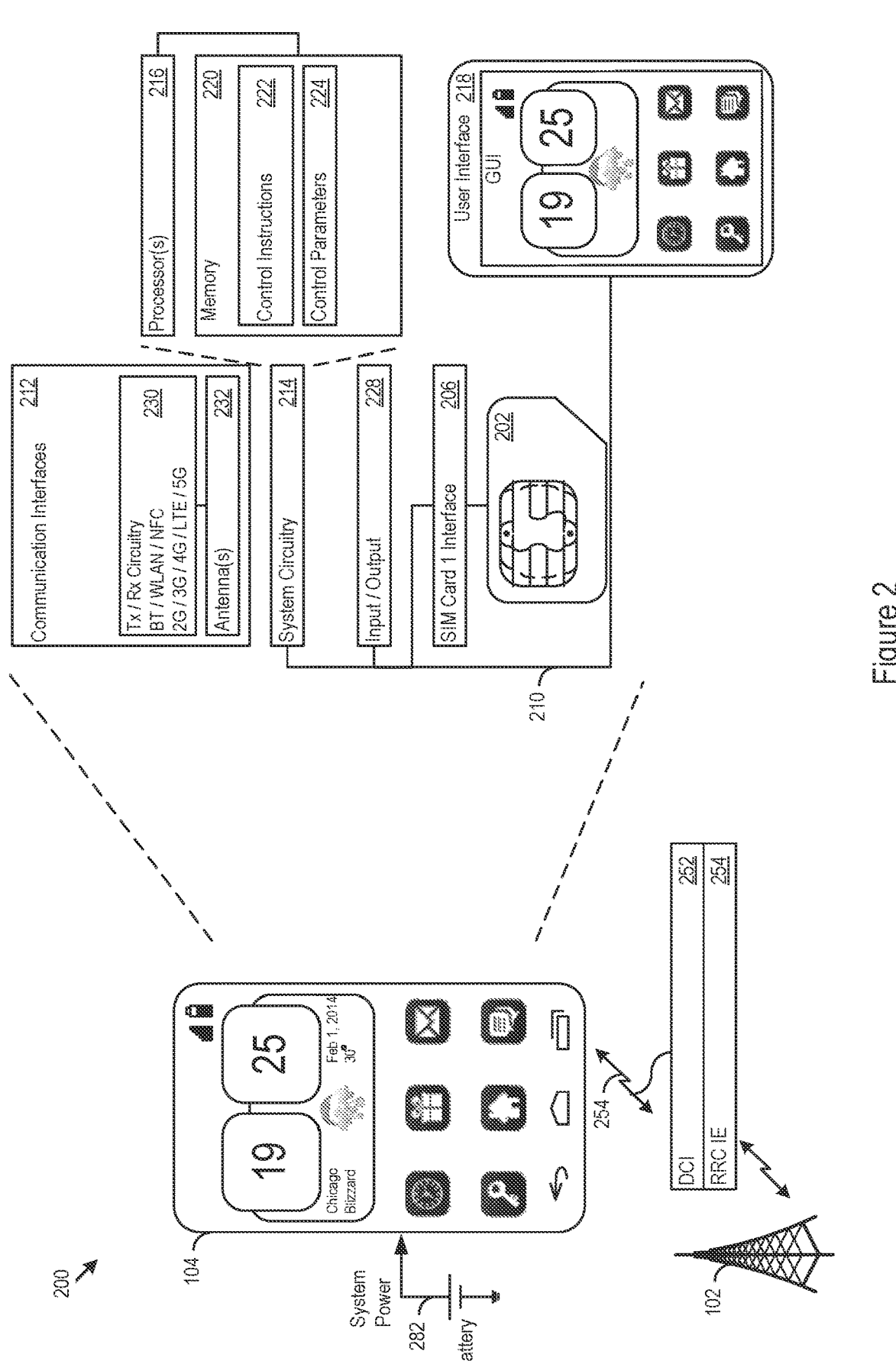
FIG. 2 shows an example communications environment.

FIG. 2 shows an example communications environment 200. In the communications environment 200, a UE 104 may communicate with a basestation 102 to receive a DCI 252 and or an RRC IE 254. In this example, the UE 104 supports one or more Subscriber Identity Modules (SIMs), such as the SIM1 202. Electrical and physical interface 206 connects SIM1 202 to the rest of the user equipment hardware, for example, through the system bus 210.

The UE 104 includes communication interfaces 212, system logic 214, and a user interface 218. The system logic 214 may include any combination of hardware, software, firmware, or other logic. The system logic 214 may be implemented, for example, with one or more systems on a chip (SoC), application specific integrated circuits (ASIC), discrete analog and digital circuits, and other circuitry. The system logic 214 is part of the implementation of any desired functionality in the UE 104. In that regard, the system logic 214 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 218. The user interface 218 and the inputs 228 may include a graphical user interface, touch sensitive display, haptic feedback or other haptic output, voice or facial recognition inputs, buttons, switches, speakers and other user interface elements. Additional examples of the inputs 228 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

The system logic 214 may include one or more processors 216 and memories 220. The memory 220 stores, for example, control instructions 222 that the processor 216 executes to carry out desired functionality for the UE 104. The control parameters 224 provide and specify configuration and operating options for the control instructions 222. The memory 220 may also store any BT, WiFi, 3G, 4G, 5G or other data 226 that the UE 104 will send, or has received, through the communication interfaces 212.

In various implementations, the system power may be supplied by a power storage device, such as a battery 282.

In the communication interfaces 212, Radio Frequency (RF) transmit (Tx) and receive (Rx) circuitry 230 handles transmission and reception of signals through one or more antennas 232. The communication interface 212 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 212 may include transceivers that support transmission and reception under the 2G, 3G, BT, WiFi, Universal Mobile Telecommunications System (UMTS), High Speed Packet Access (HSPA)+, 4G/Long Term Evolution (LTE), NTN, and 5G NR standards. The techniques described below, however, are applicable to other wireless communications technologies whether arising from the 3rd Generation Partnership Project (3GPP), GSM Association, 3GPP2, IEEE, or other partnerships or standards bodies.

In various implementations that use the DCI to signal repetition parameter values and/or changes, the bits may be added to the DCI, existing bit may be reinterpreted (e.g., conditionally), or existing bits may be reassigned. In the illustrative examples below, the PUSCH is configured by format 0_0, 0_1, and 0_2, the PDSCH is configured by format 1_0, 1_1 and 1_2. In these formats, certain bits may be conditionally reinterpreted depending on whether the HARQ process feedback is disabled or enabled. In the examples, various bit fields are used to indicate HARQ-related configurations, such as new data indicator (NDI), Redundancy version (RV), and Downlink assignment index (DAI). In addition, the DCI formats used for PDSCH also include 'PDSCH-to-HARQ_feedback'. Where, DAI and 'PDSCH-to-HARQ_feedback timing indicator' are bit fields related to HARQ feedback. If HARQ feedback is disabled, the bits related to HARQ in the DCI may be temporarily unused. Furthermore, if HARQ feedback is disabled, the bit field Modulation and coding scheme (MCS) may refer to a reduced-set (e.g. a reduced number) of MCS indices, where reduced-set bits are used for the MCS bit field and other bits may be temporarily unused. Therefore, when HARQ feedback is disabled, the unused bit fields can be reinterpreted to indicate the repetition parameters for the PDSCH/PUSCH.

Repetition may, in some cases, refer to pure repetition (the repetition data is all the same as the initial data), aggregation (the repetition data may be another redundancy version of the initial data) or both.

The Tables below show illustrative examples of bits that may be conditionally reinterpreted in the DCI for various formats. The bit in the illustrative examples may be reinterpreted when, for example, HARQ process feedback is disabled.

TABLE 1

| DCI Format 0_0 |
|---|

The following bits can be interpreted in DCI format 0_0:
- New data indicator - 1 bit
- Redundancy version - 2 bits
- HARQ process number - 4 bits
- Modulation and coding scheme - 5 bits (maybe some of the 5 bits can be reinterpreted)

For 'New data indicator', 'Redundancy version', and 'HARQ process number', seven bits can be re-interpreted for repetition number indicator. If the needed number of bits is less 7, then any combination of the 7 bits is feasible to be interpreted as the repetition number indicator, other bits are reserved by default. However, if the needed number of bits is larger than 7, then new bit fields can be added to DCI. For 'Modulation and coding scheme', the available bits to be re-interpreted may be 0,1,2,3, or 4 bits, which depends on how many bits are reserved for the reduced-set of the MCS bit field and the other unused bits can be used to be reinterpreted. Implementation example: If 5 bits are need to indicate the repetition number, then we have the following cases:
- 1 bit from 'New data indicator' + 2 bits from 'Redundancy version' + 2 bits from 'HARQ process number';
- 1 bit from 'New data indicator' + 4 bits from 'HARQ process number';
- 1 bit from 'Redundancy version' + 4 bits from 'HARQ process number';
- 2 bits from 'Redundancy version' + 3 bits from 'HARQ process number';
- 1 bit from 'New data indicator' + 1 bit from 'Redundancy version' + 3 bits from 'HARQ process number'.

TABLE 1-continued

| DCI Format 0__0 |
| --- |
| •   1 bit from 'New data indicator' + 1 bit from 'Redundancy version' + 1 bits from 'HARQ process number' + 2 bits from 'Modulation and coding Scheme' |

Table 1 shows an illustrative example for DCI format 0_0.

TABLE 2

| DCI Format 0__1 |
| --- |

When DCI format 0__1 is used for scheduling one or multiple PUSCH, then following bits can be re-interpreted:

- New data indicator - 1, 2, 3, 4, 5, 6, 7, or 8 bits if the maximum number of schedulable PUSCHs is 1,2,3,4,5,6,7, or 8, where each bit corresponds to one scheduled PUSCH
- Redundancy version - 2, 2, 3, 4, 5, 6, 7, or 8 bits if the maximum number of schedulable PUSCHs is 1,2,3,4,5,6,7, or 8, where each bit corresponds to one scheduled PUSCH
- HARQ process number - 4 bits
- Modulation and coding scheme - 5 bits (maybe some of the 5 bits can be re-interpreted)
- 1st downlink assignment index - 1, 2 or 4 bits:
  - ○   1 bit for semi-static HARQ-ACK codebook;
  - ○   2 bits for dynamic HARQ-ACK codebook, or for enhanced dynamic HARQ-ACK codebook without UL-TotalDAI-Included-r16 configured;
  - ○   4 bits for enhanced dynamic HARQ-ACK codebook and with UL-TotalDAI-Included-r16 = "enable"..
- 2nd downlink assignment index - 0, 2 or 4 bits:
  - ○   2 bits for dynamic HARQ-ACK codebook with two HARQ-ACK sub-codebooks, or for enhanced dynamic HARQ-ACK codebook with two HARQ-ACK sub-codebooks and without UL-TotalDAI-Included-r16 configured;
  - ○   4 bits for enhanced dynamic HARQ-ACK codebook with two HARQ-ACK sub-codebooks and with UL-TotalDAI-Included-r16 = "enable";
  - ○   0 bit otherwise.

There are different bits for 'New data indicator' and 'Redundancy version' with different maximum number of schedulable PUSCH. Thus, different number of bits can be interpreted for indicating repetition number. For these two fields, if the scheduled number of RUSCH is 1, 2, 3, 4, 5, 6, 7, or 8, then the number of bits that may be re-interpreted is 3,4, 6, 8, 10, 12, 14, or 16, respectively. However, not all bits available for re-interpretation may necessarily be used in all implementations. For '1st downlink assignment index' and '2nd downlink assignment index', when HARQ feedback is disabled, no feedback is needed. Thus, these two-bit fields remain the least bits, for 1 bit. Or if the configuration of these two fields are determined by other related PUSCH, e.g. nearby PUSCH or last PUSCH, in 'enabling HARQ feedback' mode, then the number of available bits to be re-interpreted depend on the configuration of related PUSCH.

- 1 bit for semi-static HARQ-ACK codebook;
- 2 bits for dynamic HARQ-ACK codebook, or for enhanced dynamic HARQ-ACK codebook without UL-TotalDAI-Included-r16 configured ;
- 4 bits for enhanced dynamic HARQ-ACK codebook and with UL-TotalDAI-Included-r16 = "enable" ;
- 4 bits for dynamic HARQ-ACK codebook with two HARQ-ACK sub-codebooks, or for enhanced dynamic HARQ-ACK codebook with two HARQ-ACK sub-codebooks and without UL-TotalDAI-Included-r16 configured;
- 8 bits for enhanced dynamic HARQ-ACK codebook with two HARQ-ACK sub-codebooks and with UL-TotalDAI-Included-r16 = "enable"

For 'HARQ process number', 4 bits can be re-interpreted.
For 'Modulation and coding scheme', the available bits to be re-interpreted may be 0,1,2,3, or 4 bits, which depends on how many bits are reserved for the reduced-set of the MCS bit field and the other unused bits can be used to be reinterpreted. Accordingly, the original bits which can be re-interpreted depends on the number of scheduled PUSCH, and the bit of 'downlink assignment index' and 'Modulation and coding scheme' remained when HARQ feedback is disabled. When there are multiple scheduled PUSCHs, there can be only one indicator which indicates the repetition number for all the scheduled PUSCHs, or there can be multiple indicators where each one indicates independently the repetition number of each scheduled PUSCH.

Table 2 shows an illustrative example for DCI format 0_1.

TABLE 3

| DCI Format 0_2 |
| --- |
| The following bits can be re-interpreted:<br>   •    New data indicator - 1 bit<br>   •    Redundancy version - 0, 1 or 2 bits determined by higher layer parameter numberOfBitsForRV-ForDCI-Format0-2<br>   •    HARQ process number - 0, 1, 2, 3 or 4 bits determined by higher layer parameter harq-ProcessNumberSizeForDCI-Format0-2<br>   •    Modulation and coding scheme - 5 bits (maybe some of the 5 bits can be re-interpreted)<br>   •    Downlink assignment index - 0, 1, 2 or 4 bits<br>      ○  0 bit if the higher layer parameter downlinkAssignmentIndexForDCI-Format0-2 is not configured;<br>      ○  1, 2 or 4 bits otherwise,<br>   •    1st downlink assignment index - 1 or 2 bits:<br>      ○  1 bit for semi-static HARQ-ACK codebook;<br>      ○  2 bits for dynamic HARQ-ACK codebook.<br>   •    2nd downlink assignment index - 0 or 2 bits<br>      ○  2 bits for dynamic HARQ-ACK codebook with two HARQ-ACK sub-codebooks;<br>      ○  0 bit otherwise.<br>For 'New data indicator', 'Redundancy version', 'HARQ process number, the minimum number of bits which can be interpreted is 0, and the maximum number, for this illustrative example, is 7 according to the higher layer configuration.<br>For 'Modulation and coding scheme', the available bits to be re-interpreted may be 0, 1, 2, 3, or 4 bits, which depends on how many bits are reserved for the reduced-set of the MCS bit field and the other unused bits can be used to be reinterpreted.<br>For 'Downlink assignment index', when HARQ feedback is disabled, the higher layer parameter downlinkAssignmentIndexForDCI-Format0-2 will probably not be configured, resulting in 0 bit to be re-interpreted. However, if the configuration of this field is determined by other related PUSCH, e.g. nearby PUSCH or last PUSCH, in 'enabling HARQ feedback' mode, then the number of available bits to be re-interpreted is 1, 2, or 4, depending on the configuration of related PUSCH. |

Table 3 shows an illustrative example for DCI format 0_2.

TABLE 4

| DCI Format 1_0 |
| --- |
| If the CRC of the DCI format 1_0 is scrambled by the cell regional network temporary indicator (C-RNTI) and the "Frequency domain resource assignment" field are not of all ones, following bits can be re-interpreted:<br>   •    New data indicator - 1 bit.<br>   •    Redundancy version - 2 bits.<br>   •    HARQ process number - 4 bits.<br>   •    Modulation and coding scheme - 5 bits (maybe some of the 5 bits can be re-interpreted)<br>   •    Downlink assignment index - 2 bits.<br>   •    PDSCH-to-HARQ_feedback timing indicator - 3 bits.<br>For 'New data indicator', 'Redundancy version', 'HARQ process number', 'Downlink assignment index', 'PDSCH-to-HARQ_feedback timing indicator', 12 bits can be re-interpreted.<br>For 'Modulation and coding scheme', the available bits to be re-interpreted may be 0,1,2,3, or 4 bits, which depends on how many bits are reserved for the reduced-set of the MCS bit field and the other unused bits can be used to be reinterpreted.<br>If the cyclic redundancy check (CRC) of the DCI format 1_0 is scrambled by the temporary C-RNTI (TC-RNTI), following bits can be re-interpreted:<br>   •    New data indicator - 1 bit.<br>   •    Redundancy version - 2 bits.<br>   •    HARQ process number - 4 bits.<br>   •    Modulation and coding scheme - 5 bits (maybe some of the 5 bits can be re-interpreted)<br>   •    Downlink assignment index - 2 bits.<br>   •    PDSCH-to-HARQ_feedback timing indicator - 3 bits.<br>For 'New data indicator', 'Redundancy version', 'HARQ process number', 'Downlink assignment index', 'PDSCH-to-HARQ_feedback timing indicator', 12 bits can be re-interpreted.<br>For 'Modulation and coding scheme', the available bits to be re-interpreted may be 0,1,2,3, or 4 bits, which depends on how many bits are reserved for the reduced-set of the MCS bit field and the other unused bits can be used to be reinterpreted. |

Table 4 shows an illustrative example for DCI format 1_0.

TABLE 5

DCI Format 1_1

If the higher layer parameter maxNrofCodeWordsScheduledByDCI equals 2, there are two transport blocks to be configured in DCI. Otherwise, there is one transport block to be configured in DCI. According to the configuration of the higher layer parameter maxNrofCodeWordsScheduledByDCI, following bit can be re-interpreted:

- For transport block 1:
  - ○ New data indicator - 1 bit
  - ○ Redundancy version - 2 bits
  - ○ Modulation and coding scheme - 5 bits (maybe some of the 5 bits can be re-interpreted)
- For transport block 2 (only present if maxNrofCodeWordsScheduledByDCI equals 2):
  - ○ New data indicator - 1 bit
  - ○ Redundancy version - 2 bits as defined in Table 7.3.1.1.1-2
  - ○ Modulation and coding scheme - 5 bits (maybe some of the 5 bits can be re-interpreted)
- HARQ process number - 4 bits
- Downlink assignment index - number of bits as defined in the following
  - ○ 6 bits if more than one serving cell are configured in the DL and the higher layer parameter NFI-TotalDAI-Included-r16 = enable;
  - ○ 4 bits if only one serving cell are configured in the DL and the higher layer parameter NFI-TotalDAI-Included-r16 = enable;
  - ○ 4 bits if more than one serving cell are configured in the DL, the higher layer parameter pdsch-HARQ-ACK-Codebook=dynamic or pdsch-HARQ-ACK-Codebook=enhancedDynamic-r16, and NFI-TotalDAI-Included-r16 is not configured;
  - ○ 4 bits if one serving cell is configured in the DL, and the higher layer parameter pdsch-HARQ-ACK-Codebook=dynamic, and the UE is not provided CORESETPoolIndex or is provided CORESETPoolIndex with value 0 for one or more first CORESETs and is provided CORESETPoolIndex with value 1 for one or more second CORESETs, and is provided ACKNACKFeedbackMode = JointFeedback ;
  - ○ 2 bits if only one serving cell is configured in the DL, the higher layer parameter pdsch-HARQ-ACK-Codebook=dynamic or pdsch-HARQ-ACK-Codebook=enhancedDynamic-r16, and NFI-TotalDAI-Included-r16 is not configured, when the UE is not configured with CORESETPoolIndex or the value of CORESETPoolIndex is the same for all CORESETs if CORESETPoolIndex is provided or the UE is not configured with ACKNACKFeedbackMode = JointFeedback ;
  - ○ 0 bits otherwise.
- PDSCH-to-HARQ_feedback timing indicator - 0, 1, 2, or 3 bits, the bitwidth for this field is determined as bits, where I is the number of entries in the higher layer parameter dl-DataToUL-ACK.
  - ○ New feedback indicator - 0, 1 or 2 bits.
  - ○ 1 bit if the higher layer parameter pdsch-HARQ-ACK-Codebook = enhancedDynamic-r16 and the higher layer parameter NFI-TotalDAI-Included-r16 is not configured;
  - ○ 2 bits if the higher layer parameter pdsch-HARQ-ACK-Codebook = enhancedDynamic-r16 and the higher layer parameter NFI-TotalDAI-Included-r16 = enable ;
  - ○ 0 bit otherwise.

For 'New data indicator', 'Redundancy version', 3 bits can be re-interpreted for each transport block.
For 'Modulation and coding scheme', the available bits to be re-interpreted may be 0,1,2,3, or 4 bits for each transport block, which depends on how many bits are reserved for the reduced-set of the MCS bit field and the other unused bits can be used to be reinterpreted.
For 'Downlink assignment index', when HARQ feedback is disabled, the higher layer parameter related to 'Downlink assignment index,' in some cases, may not be configured, resulting in 0 bits to be re-interpreted. However, if the configuration of this field is determined by other related PUSCH, e.g. nearby PUSCH or last PUSCH, in 'enabling HARQ feedback' mode, then the number of available bits to be re-interpreted is 2, 4, or 6, depending on the configuration of the related PUSCH.
For 'HARQ process number', 4 bits can be re-interpreted.
For 'PDSCH-to-HARQ_feedback timing indicator', when HARQ feedback is disabled, this field may be configured as 0 bits, resulting in 0 bits to be re-interpreted. However, if the configuration of this field is determined by other related PUSCH, e.g. nearby PUSCH or last PUSCH, in 'enabling HARQ feedback' mode, then the number of available bits to be re-interpreted is 0, 1, 2, or 3, depending on the configuration of the related PUSCH.

TABLE 5-continued

| DCI Format 1_1 |
| --- |
| For 'New feedback indicator', the higher layer parameter pdsch-HARQ-ACK-Codebook and NFI-TotalDAI-Included-r16, in some cases, may not be configured, resulting in 0 bits to be re-interpreted. However, if the configuration of this field is determined by other related PUSCH, e.g. nearby PUSCH or last PUSCH, in 'enabling HARQ feedback' mode, then the number of available bits to be re-interpreted is 0, 2, or 4, depending on the configuration of the related PUSCH. |

Table 5 shows an illustrative example for DCI format 1_1.

TABLE 6

| DCS Format 1_2 |
| --- |
| The following bits can be re-interpreted:<br>• New data indicator - 1 bit<br>• Redundancy version - 0, 1 or 2 bits determined by higher layer parameter numberOfBitsForRV-ForDCI-Format1-2<br>• HARQ process number - 0, 1, 2, 3 or 4 bits determined by higher layer parameter harq-ProcessNumberSizeForDCI-Format1-2<br>• Modulation and coding scheme - 5 bits (maybe some of the 5 bits can be re-interpreted)<br>• Downlink assignment index - 0, 1, 2 or 4 bits<br>  ○ 0 bit if the higher layer parameter downlinkAssignmentIndexForDCI-Format1-2 is not configured;<br>  ○ 1, 2 or 4 bits determined by higher layer parameter downlinkAssignmentIndexForDCI-Format1-2 otherwise,<br>  ○ 4 bits if more than one serving cell are configured in the DL and the higher layer parameter pdsch-HARQ-ACK-Codebook=dynamic ;<br>  ○ 4 bits if one serving cell are configured in the DL and the higher layer parameter pdsch-HARQ-ACK-Codebook=dynamic, and the UE is not provided CORESETPoolIndex or is provided CORESETPoolIndex with value 0 for one or more first CORESETs and is provided CORESETPoolIndex with value 1 for one or more second CORESETs, and is provided ACKNACKFeedbackMode = JointFeedback ;<br>  ○ 1 or 2 bits if only one serving cell is configured in the DL and the higher layer parameter pdsch-HARQ-ACK-Codebook=dynamic, when the UE is not configured with CORESETPoolIndex or the value of CORESETPoolIndex is the same for all CORESETs if CORESETPoolIndex is provided or the UE is not configured with ACKNACKFeedbackMode = JointFeedback ;<br>• PDSCH-to-HARQ_feedback timing indicator - 0, 1, 2, or 3 bits, the bitwidth for this field is determined as $\lceil \log_2(I) \rceil$ bits, where I is the number of entries in the higher layer parameter dl-DataToUL-ACK-ForDCI-Format1-2.<br>For 'New data indicator', 'Redundancy version', 'HARQ process number', the minimum number of bits which can be interpreted is 0, and the maximum number, for this illustrative example, is 7 according to the higher layer configuration.<br>For 'Modulation and coding scheme', the available bits to be re-interpreted may be 0,1,2,3, or 4 bits for each transport block, which depends on how many bits are reserved for the reduced-set of the MCS bit field and the other unused bits can be used to be reinterpreted.<br>For 'Downlink assignment index', when HARQ feedback is disabled, the higher layer parameter downlinkAssignmentIndexForDCI-Format0-2 may, in some cases, not be configured, resulting in 0 bits to be re-interpreted. However, if the configuration of this field is determined by other related PUSCH, e.g. nearby PUSCH or last PUSCH, in 'enabling HARQ feedback' mode, then the number of available bits to be re-interpreted is 1, 2, or 4, depending on the configuration of the related PUSCH.<br>For 'PDSCH-to-HARQ_feedback timing indicator', when HARQ feedback is disabled, this field may be configured as 0 bits, resulting in 0 bits to be re-interpreted. However, if the configuration of this field is determined by other related PUSCH, e.g. nearby PUSCH or last PUSCH, in 'enabling HARQ feedback' mode, then the number of available bits to be re-interpreted is 0, 1, 2, or 3, depending on the configuration of the related PUSCH. |

Table 6 shows an illustrative example for DCI format 1_2.

In an example cellular standard, the maximum HARQ process number is 16, which is defined in RRC signaling. In NTN, 16 HARQ processes may be not enough, thus the maximum HARQ process number may exceed 16, according to the RRC signaling, e.g., nrofHARQ-Processes-ForPDSCH. In this case, additional bit/bits is/are needed to interpreted for HARQ process number larger than 16. When the maximum HARQ process number is not larger than 16, no additional bit is need, when the maximum HARQ process number is larger 16, additional is needed to be interpreted for HARQ process number. The number '16' is an example of the threshold to illustrate the method, actually the threshold can be any other number without the limitation of '16'.

In some cases, one bit from the RV field may be reinterpreted for indication of repetition-related parameter values or HARQ process number values. As a result, the system may support two RV values (e.g., for the one remaining bit) for scheduling, where prior to reinterpretation four values may have been supported (e.g., using two bits).

In various radio standards, if only a single bit is used for RV indication, the RV for scheduling will be 0 or 1. In some cases, to increase the flexibility in RV combinations to provide benefits during re-transmission, additional indications may be used allow selection from among 0, 1, and two additional RV values. Table 6A from following table for signaling for RV values.

TABLE 6A

| RV Field to Value Relationships | |
| --- | --- |
| RV Field | RV Value |
| 00 | 0 |
| 01 | 1 |
| 10 | 2 |
| 11 | 3 |

Example RV Bit Reinterpretation 1

The basestation may explicitly configure a subset for RV, e.g., {0,2} or {0,3}. Then, the UE may take the RV from this subset along with the single bit indication in RV field.

Example RV Bit Reinterpretation 2

The RV table may be reordered such that: e.g., the 00 may still refer to the RV=0, but 01 can be either 2 or 3. Table 6B and table 6C are two examples for reordered RV table

TABLE 6B

| RV Field to Value Relationships | |
| --- | --- |
| RV Field | RV Value |
| 00 | 0 |
| 01 | 2 |
| 10 | 1 |
| 11 | 3 |

TABLE 6C

| RV Field to Value Relationships | |
| --- | --- |
| RV Field | RV Value |
| 00 | 0 |
| 01 | 3 |
| 10 | 1 |
| 11 | 2 |

Example RV Bit Reinterpretation 3

RV value 0 will be used for initial transmission for most of cases (even all cases). Then, in this way, only the RV which is used for re-transmission is needed, e.g., the two RV values for re-transmission may be {2,3}, or {1,3}, or {1,2}.

In some cases, one or several bits from the MCS field may be reinterpreted for indication of repetition-related parameter values or HARQ process number values, e.g., the most significant bit (MSB), least significant bit (LSB), or other bit, of the MCS bits.

Once the bits (X MSB, e.g., X=1) of MCS is adopted for HARQ process number indication, the scheduling (indication of MCS) may rely on the remaining bits.

For example, current 5 bits are used to MCS indication, 'ABCDE', the MSB (A) can be taken for the HARQ process number indication. Then, once the reception of DCI, the UE can only get the MCS indication according to the remaining bits ('BCDE').

Moreover, the mapping between BCDE to MCS index can be the same as before (which means that only part of MCS with lower MCS index is supported for scheduling).

Using bits that have been reinterpreted (such as in the illustrative examples above), reassigned, added to the DCI (or other signaling element), or virtually any other source of signaling bits, the repetition parameters may be indicated. Indication of the repetition parameter may be achieved through virtually any signaling or encoding scheme.

For example, the indicator may specifically indicate a particular parameter value using an absolute indicator, such as an index. An index may be used to specify an associated value. In some implementations, each index may specify a unique value different from the value associated with any other index. In some implementations, a tuple of indices may be used to specify individual values.

For example, the indicator may indicate that value using a relative indicator the shows a particular change (or an affirmative indication of no change) using a flag indicative of the change or lack thereof. In some cases, the relative change may be incremental (e.g., increase by one increment, decrease by one increment, or no change). In some cases, a magnitude of change may be specified and/or a short cut may be used (e.g., go to the minimum/maximum value, increase/decrease by specified amount, increase/decrease by specified number of increments).

In general, the relative indicator provides navigation through multiple options. While, in some cases, this may correspond to increase/decrease/no change other navigation paradigms may be used. The relative indicator may guide through set options in a set order that does not necessarily proceed with increasing/decreasing values. For example, adjacency relationships between values may be established (e.g., establishing the neighboring values to other values) and the relative indicator may indicate a change from a value to an adjacent value. Values may be organized in multiple-dimensional data structures such that values may have one, two, or more than two adjacent values.

In some cases, both absolute and relative indicators may be used. For example, each value option for a repetition parameter may have an associated index. Then, the system may signal the value option by indicating a relative change from another option or by providing the index. The system may include a bit field to indicate whether an index or relative change is being signaled.

The value options for repetition parameter may be provide via expressed sets and/or rule sets. Rule sets may include sets of values for which the individual values may be generated through execution of one or more rules.

In an illustrative example of a rule set, individual values may be generated through execution of a mathematical formula, e.g., using an index or other argument as input. In the illustrative example, maximum and/or minimum values may be provided as additional rules. Accordingly, the values of a rule set may not necessarily be expressly stored. However, they may be readily calculated using the one or more rules and/or any signaled inputs. Rules may be specified by defaults and/or specific signaling. In an illustrative example, a mathematical formula may be specified by default (e.g., by details in the radio communication standard) while minimum/maximum values may be specified by signaling (e.g., signaling via the RRC layer).

In an illustrative example of an expressed set, a tuple (e.g., a vector, matrix, table, or other group of values) may be specifically defined by default or via signaling. Accordingly, rules are not necessarily used with expressed sets because the values in an expressed set may be specified by default or specifically signaled.

In some cases, an expressed set may be generated using rules. For example, a basestation may generate a set of values based on one or more rules and then signal the generated set to the UE as an expressed set.

In some cases, signaling may be conditional. For example, a particular set of rules, radio signaling parameters, repetition parameters, or other signaling may be conditioned on the whether HARQ process feedback is enabled or disabled.

In an illustrative scenario, the RRC layer may provide multiple RRC IEs. A first of the IEs may be active and govern signaling when HARQ process feedback is enabled. A second of the IEs may be active and govern signaling when HARQ process feedback is disabled.

In another illustrative scenario, the RRC layer may provide a single RRC IE with first parameters that are valid/ used when HARQ process feedback is enabled and second parameters that are valid/used when HARQ process feedback is disabled. However, some parameters in that same single RRC IE may be valid/used regardless of whether HARQ process feedback is enabled or disabled. When a single RRC IE is used in lieu of multiple conditional RRC IEs, the single RRC IE may, in some cases, have more parameter fields then an individual conditional RRC IE. However, the single RRC IE may, in some cases, account for the different HARQ process feedback cases through parameter reuse.

Example Implementations A: Index-Based Signaling

In the following examples (A1.1-A2.3), the corresponding bit fields in DCI refer to an index which corresponds to the repetition number. If x bits can be used to dynamically indicate the repetition number, the x bits can refer to a maximum of $2^x$ index values, corresponding a maximum of $2^x$ different repetition numbers of transmission. In these illustrative examples, the various repetition number values may be specified via the radio standard (or otherwise established by default) or configured at the RRC layer. The relationship between an index and repetition number can be specified by an expressed set or a rule set of values.

Example Scenario A1: Different HARQ Process Feedback States Use the Same RRC IE Example Case A1.1: In this RRC IE, two or more values of repetition number may be configured. One value is used as the repetition number when HARQ feedback is enabled, and other values are used as candidate values when HARQ feedback is disabled. The candidate values for 'HARQ feedback disabled' mode correspond to the index dynamically indicating the repetition number in DCI one-to-one. Candidate values may refer to one or more values for a repetition parameter that may be selected when HARQ feedback is disabled.

Among multiple values configured on the RRC, a first value (or any other designated value) may be used indicate the repetition number when HARQ feedback is enabled. For example, if the RRC IE is configured as {2, 2, 8, 16, 128}, then the repetition number is 2 when HARQ feedback is enabled, and the candidate repetition numbers are {2, 8, 16, 128} when HARQ feedback is disabled. In an example 'HARQ feedback disabled' mode, the relationships between the repetition numbers and the indexes dynamically indicating the repetition number in DCI are shown in Table 7. Although specific example candidate values are shown, virtually any groups of one or more positive integers may be used as candidate values. The values for a given implementation may be selected based on a trade-off between reliability through repetition and signaling efficiency for various channel quality levels.

TABLE 7

| Example Candidate Values A1.1 | |
| Repetition Index | Repetition number |
| --- | --- |
| 0 | 2 |
| 1 | 8 |
| 2 | 16 |
| 3 | 128 |

Example Case A1.2: In this example, three of values for the repetition number are configured using the RRC IE. The first value is used as the repetition number when HARQ feedback is enabled, and the first value is used as the minimum value of repetition number when HARQ feedback is disabled. The second value is used as the maximum value of repetition number when HARQ feedback is disabled. The third value is used to scale the step size (e.g., a step-size scaling factor) between the two repetition numbers corresponding to two consecutive indexes dynamically indicating repetition numbers in DCI when HARQ feedback is disabled. For example, the step-size scaling factor may establish the difference or ratio between successive values. In some cases, the step-size scaling factor may be related to the interval between successive values through a mathematical formula (e.g., more or less complex than a ratio or difference). In some cases, multiple scaling factors may be specified. Accordingly, the first, second, and third values discussed above do not necessarily specify the actual rule set in its entirety. However, the values to correspond values in the set (e.g., the minimum and the maximum values. However, in some other cases, the parameters used to generate a rule set of values may not necessarily correspond to any of the values in the rule set.

In an illustrative example, an RRC may provide the values {2, 128, 4}. In the example, when HARQ feedback is enabled, the repetition number is 2. When HARQ feedback is disabled, the minimum value of repetition number is 2, the maximum value of repetition number is 128, and the ratio of the two repetition numbers corresponding to two consecutive indexes dynamically indicating repetition number in DCI is 4. Then, when the HARQ feedback is disabled, the relationship between the repetition numbers and the indexes dynamically indicating repetition numbers in the DCI can be expressed in a mathematical formula $N(i)=2*4^i$, where i refers to the value of the index and $N(i)$ refers to the repetition number corresponding to the index i. The corresponding relationships are shown in Table 8.

TABLE 8

| Example Candidate Values A1.2 | |
| --- | --- |
| Repetition Index | Repetition number |
| 0 | 2 |
| 1 | 8 |
| 2 | 32 |
| 3 | 128 |

Example Case A1.3: In this example, the RRC IE configures four values for the repetition number. The first value is used as the repetition number when HARQ feedback is enabled, the second value is used as the minimum value of repetition number when HARQ feedback is disabled, and the third value is used as the maximum value of repetition number when HARQ feedback is disabled. The fourth value is used to scale the step size between consecutive values.

For example, RRC IE may provide the values {2, 2, 64, 2}. When the HARQ feedback is enabled, The repetition number is 2. When the HARQ feedback is disabled, the minimum value of repetition number is 2, the maximum value of repetition number is 64, and the ratio of the two repetition numbers corresponding to two consecutive indexes in the DCI is 2. Then, when the HARQ feedback is disabled, the relationship between the repetition numbers and the indexes can be expressed in a mathematical formula $N(i)=2*2^i$, where i refers to the value of the index and N(i) refers to the repetition number corresponding to the index i. The corresponding relationships are shown in Table 9.

TABLE 9

| Example Candidate Values A1.3 | |
| --- | --- |
| Repetition Index | Repetition number |
| 0 | 2 |
| 1 | 4 |
| 2 | 8 |
| 3 | 16 |
| 4 | 32 |
| 5 | 64 |

Example Scenario A2: Different HARQ Process Feedback States Use Different RRC IEs For example, in Example Scenario A2 one RRC IE may used to configure the repetition number when HARQ feedback is enabled, and another RRC IE may be used to configure the repetition numbers when HARQ feedback is disabled.

A value of the repetition number may configured in the HARQ-feedback-enabled RRC IE. If there is one value of repetition number configured in this RRC IE, this value is the repetition number when HARQ feedback is enabled. If there is no value of repetition number configured for the HARQ-feedback-enabled RRC IE, no repetition is needed for operation. At least one value is configured in the HARQ-feedback-disabled RRC IE. The interpretation of the configured values may differ for different implementations. For example, the configured values may specify an expressed set of values. Additionally or alternatively, the configured values may provide parameters for implementation and/or execution of one or more rules to generate a rule set of values.

Example Case A2.1: In this case, a HARQ-feedback-enabled RRC IE is used to configure the repetition number when HARQ feedback is enabled. A HARQ-feedback-disabled RRC IE, has at least one candidate value is configured for use as the repetition number when HARQ feedback is disabled. The candidate values for the HARQ-feedback-disabled mode correspond to the index dynamically indicating the repetition number in the DCI one-to-one.

For example, the HARQ-feedback-disabled RRC IE may provide the values {2, 8, 16, 128} to establish an expressed set of candidate values. The relationships between the values and index is shown in Table 10.

TABLE 10

| Example Candidate Values A2.1 | |
| --- | --- |
| Repetition Index | Repetition number |
| 0 | 2 |
| 1 | 8 |
| 2 | 16 |
| 3 | 128 |

Example Case A2.2: In this case, three values of repetition number are configured for the HARQ-feedback-disabled RRC IE. Again, a separate HARQ-feedback-enabled RRC IE is used to configure the repetition number when HARQ feedback is enabled. For the HARQ-feedback-disabled RRC IE, the first value is used as the minimum value of repetition number when HARQ feedback is disabled. The second value is used as the maximum value of repetition number when HARQ feedback is disabled. The third value is the step scaling factor.

For example, if this RRC IE is configured as {4, 16, 4}. When HARQ feedback is disabled, the minimum value of repetition number is 2, the maximum value of repetition number is 128, and the difference of the two repetition numbers corresponding to two consecutive indexes is 4. Then, when HARQ feedback is disabled, the relationship between the repetition numbers and the indexes dynamically indicating repetition numbers in the DCI can be expressed in the mathematical formula: $N(i)=4+4i$, where i refers to the value of the index and N(i) refers to the repetition number corresponding to the index i. The corresponding relationships are shown in Table 11.

TABLE 11

| Example Candidate Values A2.2 | |
| --- | --- |
| Repetition Index | Repetition number |
| 0 | 4 |
| 1 | 8 |
| 2 | 12 |
| 3 | 16 |

Example Case A2.3: In this case, when HARQ feedback is enabled, a HARQ-feedback-enabled RRC IE is used. However, when HARQ feedback is disabled, no RRC IE is used.

Again, in this case, a HARQ-feedback-enabled RRC IE is used to configure the repetition number when HARQ feedback is enabled. When HARQ feedback is disabled, the relationship between the indexes dynamically indicating the repetition number in the DCI and the repetition numbers and rule for generation of the repetition numbers can be specified by default in the radio communication standard (e.g., such as a 3GPP Standard or other standard), or the values of the index are the repetition numbers established using other default values or rules if the relationship is not specified (e.g., as specified by hardware manufacturers and/or network operators, or by a simple relationship such as, index=repetition number).

For example, when the relationship between the indexes dynamically indicating the repetition number in the DCI and the repetition numbers can be specified in the radio standard, the relationship can be expressed as a mathematical formula. For example the formula $N(i)=2 \cdot 2^i$ may be used, where i refers to the value of the index and N(i) refers to the repetition number corresponding to the index i. The corresponding relationships are shown in Table 12.

TABLE 12

| Example Candidate Values A2.3 Established via Radio Standard | |
|---|---|
| Repetition Index | Repetition number |
| 0 | 2 |
| 1 | 4 |
| 2 | 8 |
| 3 | 16 |

Alternatively, the values of the index may the repetition numbers by a simple default relationship as shown in Table 13.

TABLE 13

| Example Candidate Values A2.3 Established via Simple Default Relationship | |
|---|---|
| Repetition Index | Repetition number |
| 0 | [no repetition] |
| 1 | [no repetition] |
| 2 | 2 |
| 3 | 3 |
| 4 | 4 |
| 5 | 5 |
| 6 | 6 |
| 7 | 7 |

Example Implementations B: Increase/Decrease Flag Signaling

In the following examples (A1.1-A2.3), the corresponding bit fields in DCI refer to a flag that indicates a relative change in (or no change to) the repetition number. For example, the flag may indicate that the repetition number is increased, decreased, or unchanged. In an example case, the relationships between the three operations and the DCI bitfields shown in Table 14.

TABLE 14

| Increase/Decrease Flag Signaling | |
|---|---|
| DCI bits | Operation |
| 00 | Decrease repetition number |
| 01 | Keep the repetition number unchanged |
| 10 | Increase repetition number |

In some cases, an expressed set of values may be established and the flag directs navigation through these values. In some cases, a rule set may be used where a relationship between the current value and successive values (either increasing or decreasing successive values) is established. Similar to the examples using an index value above, the candidate values may be established using defaults (radio standard values, simple relationship, or other defaults) and/or RRC layer signaling.

Example Scenario B1: Different HARQ Process Feedback States Use the Same RRC IE

Example Case B1.1: In this example case, two or more values of the repetition number may be configured using the RRC IE. One value is used as the repetition number when HARQ feedback is enabled, and other values are used as candidate values when HARQ feedback is disabled. Similar to Example Case A1.1 above, the values are established in an expressed set that is provided by the RRC IE.

Example Case B1.2: In this example case, three values of repetition number are configured using the RRC IE. The first value is used as the repetition number when HARQ feedback is enabled and the minimum value of repetition number when HARQ feedback is disabled. The second value is used as the maximum value of repetition number when HARQ feedback is disabled. The third value is the step-size scaling factor.

In an illustrative example, the RRC IE provides that values {2, 128, 2}, When HARQ feedback is enabled, the repetition number is 2. When HARQ feedback is disabled, the minimum value of repetition number is 2, the maximum value of repetition number is 128, and the difference between consecutive values is 2. An increase flag results in the repetition number being increased by two. If the repetition number exceeds the maximum value after increase, the repetition number remains at the maximum value.

Similarly, a decrease flag result in a reduction by two. If the repetition number is less than the minimum after being decreased, the repetition number remains at the minimum value.

A 'no change' flag results in no change to the repetition number.

Example Case B1.3: In this example case, the RRC IE provides four values for the repetition number. The first value is used as the repetition number when HARQ feedback is enabled. The second value is used as the minimum value of repetition number when HARQ feedback is disabled. The third value is used as the maximum value of repetition number when HARQ feedback is disabled. The fourth value is used as step scaling factor.

In an illustrative example, the RRC IE provides that values {2, 2, 8, 2}, When HARQ feedback is enabled, the repetition number is 2 (e.g., the first value). When HARQ feedback is disabled, the minimum value of repetition number is 2, the maximum value of repetition number is 128, and the ratio between consecutive values is 2. An increase flag results in the repetition number being multiplied by two. If the repetition number exceeds the maximum value after increase, the repetition number remains at the maximum value.

Similarly, a decrease flag results in the repetition number being halved. If the repetition number is less than the minimum after being decreased, the repetition number remains at the minimum value.

Again, a 'no change' flag results in no change to the repetition number.

Example Scenario B2: Different HARQ Process Feedback States Use Different RRC IEs Similar to Scenario A2 above, three illustrative example cases are presented Scenario B2. Further, the signaling at the RRC layer may be similar between Example Scenario A2 and Example Scenario B2.

Example Case B2.1: In this case, a HARQ-feedback-enabled RRC IE is used to configure the repetition number when HARQ feedback is enabled. A HARQ-feedback-disabled RRC IE, has at least one candidate value is configured for use as the repetition number when HARQ feedback is disabled. The candidate values for the HARQ-feedback-disabled mode correspond are provided in an expressed set signaled by the HARQ-feedback-disabled RRC IE. The order of the values in the RRC IE is used to establish the adjacency relationships of the values.

Example Case B2.2: In this case, three values of repetition number are configured for the HARQ-feedback-disabled RRC IE. Again, a separate HARQ-feedback-enabled RRC IE is used to configure the repetition number when HARQ feedback is enabled. For the HARQ-feedback-disabled RRC IE, the first value is used as the minimum value of repetition number when HARQ feedback is disabled. The second value is used as the maximum value of repetition number when HARQ feedback is disabled. The third value is the step scaling factor. The flag may be used to navigate through the values generated using the values in a procedure similar to that discussed above for Example Case B1.2 and B1.3.

Example Case B2.3: Again, in this case, a HARQ-feedback-enabled RRC IE is used to configure the repetition number when HARQ feedback is enabled. When HARQ feedback is disabled, the rule for obtaining a new repetition number based on the current repetition number can be specified by default in the radio communication standard (e.g., such as a 3GPP standard or other standard), or other rules if the relationship is not specified in the radio standard (e.g., as specified by hardware manufacturers and/or network operators, or by a simple rule such as, add 1 for increase, subtract 1 for decrease).

Example Implementations C: RRC Signaling without DCI Indication

In the following examples (Example Scenarios C1-C2), the DCI is not necessarily needed to indicate the repetition number. Instead the repetition number may be configured using RRC signaling.

Example Scenario C1: Different HARQ Process Feedback States Use the Same RRC IE In this example, there may be two values of the repetition number in this RRC IE: one value is used as the repetition number when HARQ feedback is enabled, the other value is used as the repetition number when HARQ feedback is disabled. In some cases, one value of the repetition parameter may be configured. If only one value is configured, the (i) same value may be used for both enabled and disabled states or (ii) one of the states does not use repetition.

Example Scenario C2: Different HARQ Process Feedback States Use Different RRC IEs A value of the repetition number may be configured for the HARQ-feedback-enabled RRC IE. If there is one value of repetition number configured in this RRC IE, this value is the repetition number when HARQ feedback is enabled. If there is no value of repetition number configured for the HARQ-feedback-enabled RRC IE, no repetition is needed for operation.

A value of the repetition number may be configured for the HARQ-feedback-disabled RRC IE. If there is one value of repetition number configured in this RRC IE, this value is the repetition number when HARQ feedback is enabled. If there is no value of repetition number configured for the HARQ-feedback-disabled RRC IE, no repetition is needed for operation.

Figure 3:
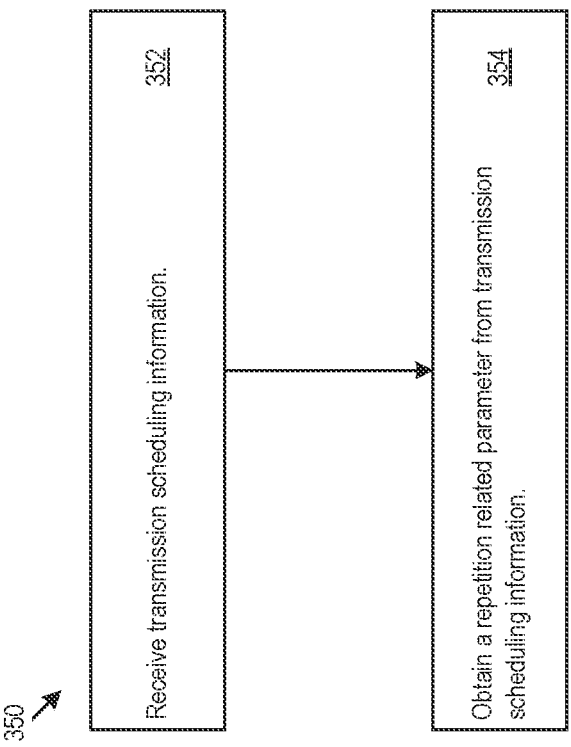
FIG. 3 shows first example communication node logic and first example user equipment logic.
Figure 3:
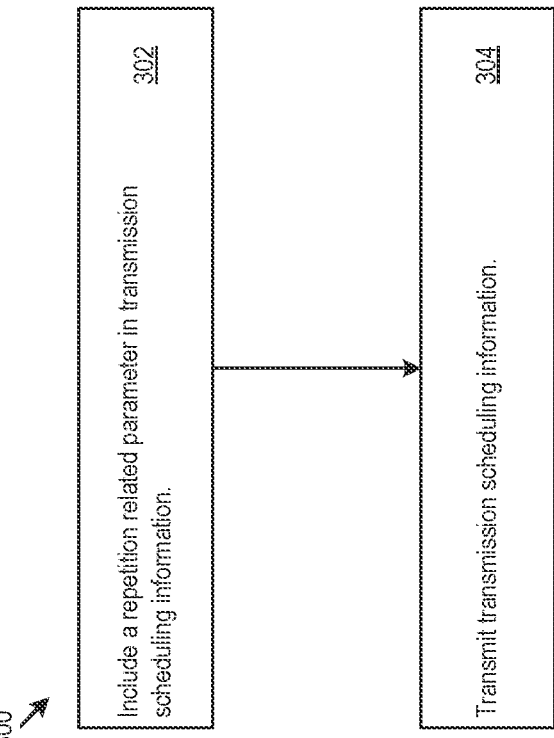

Referring now to FIG. 3, first example communication node logic 300 for a wireless communication node (or other basestation) and first example UE logic 350 for a UE is shown. The first example communication node logic 300 may include a repetition-related parameter for data transmission scheduling within transmission scheduling information (302). The first example communication node logic 300 may transmit the transmission scheduling information (304, e.g., to a UE for repetition-related parameter control).

The first example UE logic 350 may receive transmission scheduling information (352, e.g., in a transmission from a basestation). The first example UE logic 350 may obtain a repetition-related parameter for data transmission scheduling from the transmission scheduling information (354).

Figure 4:
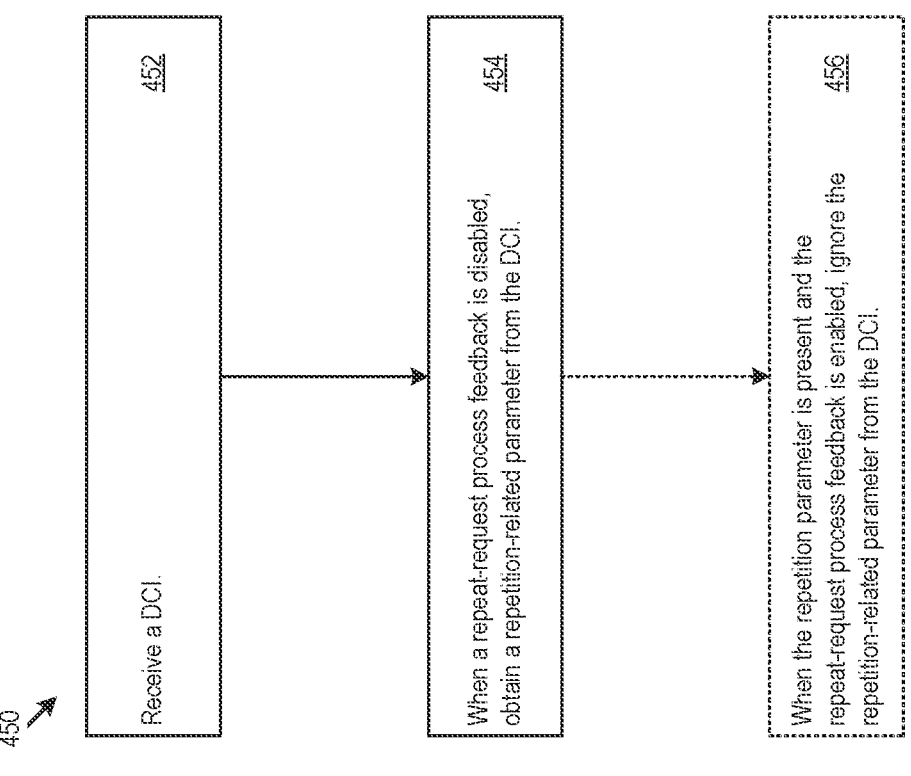
FIG. 4 shows second example communication node logic and second example user equipment logic.
Figure 4:
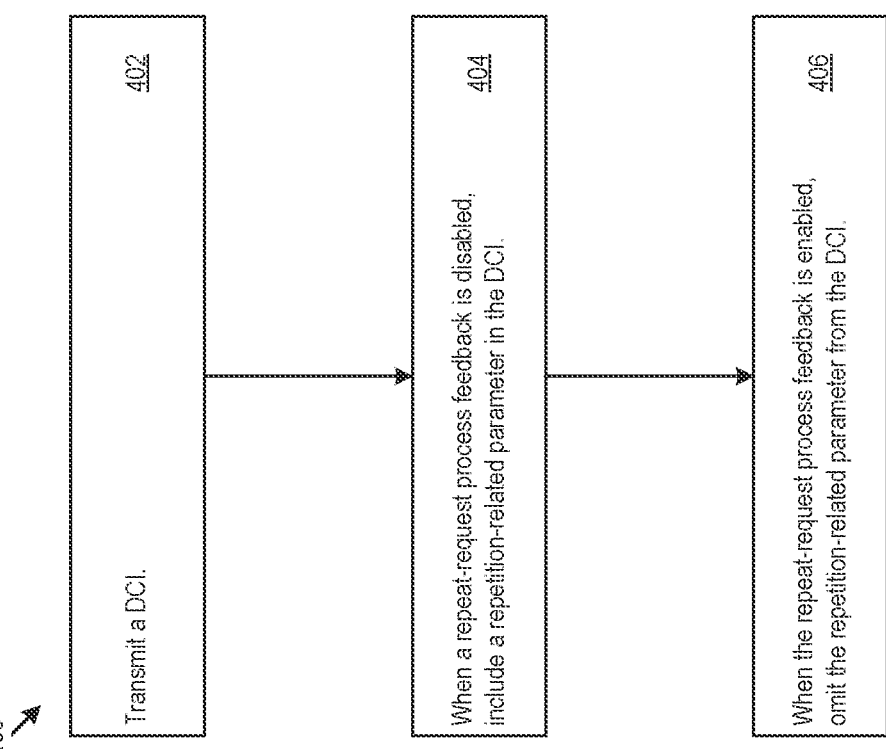

Referring now to FIG. 4, second example communication node logic 400 for a wireless communication node (or other basestation) and second example UE logic 450 for a UE is shown. The second example communication node logic 400 may transmit (e.g., from wireless communication node to a UE) downlink control information (DCI) (402). At a time that repeat-request process feedback (e.g., HARQ process feedback) is disabled, the second example communication node logic 400 may include a repetition-related parameter to control data transmission scheduling in the DCI (404). At a time that repeat-request process feedback (e.g., HARQ process feedback) is enabled, the second example communication node logic 400 may omit a repetition-related parameter to control data transmission scheduling from the DCI (406).

The second example UE logic 450 may receive (e.g., at a UE from wireless communication node) downlink control information (DCI) (452). At a time that a repeat-request process feedback (e.g., HARQ process feedback) is disabled, the second example UE logic 450 may obtain a repetition-related parameter to control data transmission scheduling in the DCI (454). Optionally, when the repetition-related parameter to control data transmission scheduling is present in the DCI and at a time that a repeat-request process feedback (e.g., HARQ process feedback) is enabled, the example UE logic 450 may ignore the repetition-related parameter (456).

Figure 5:
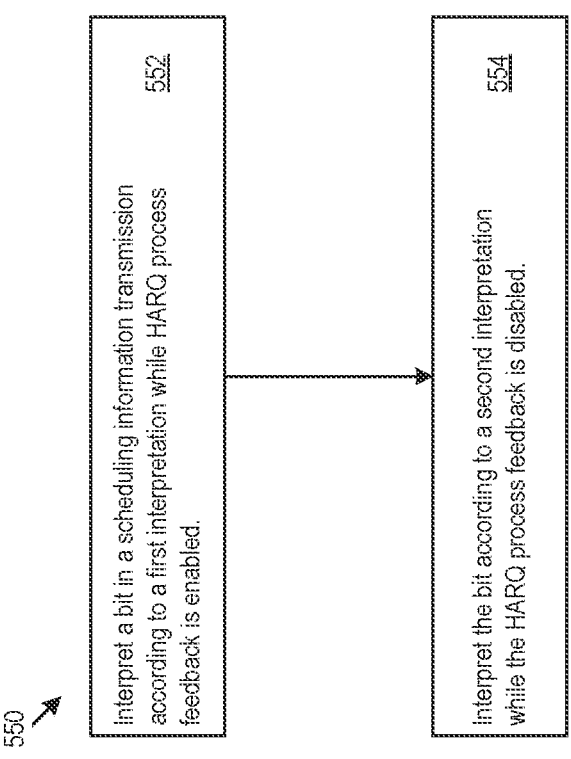
FIG. 5 shows third example communication node logic and third example user equipment logic.
Figure 5:
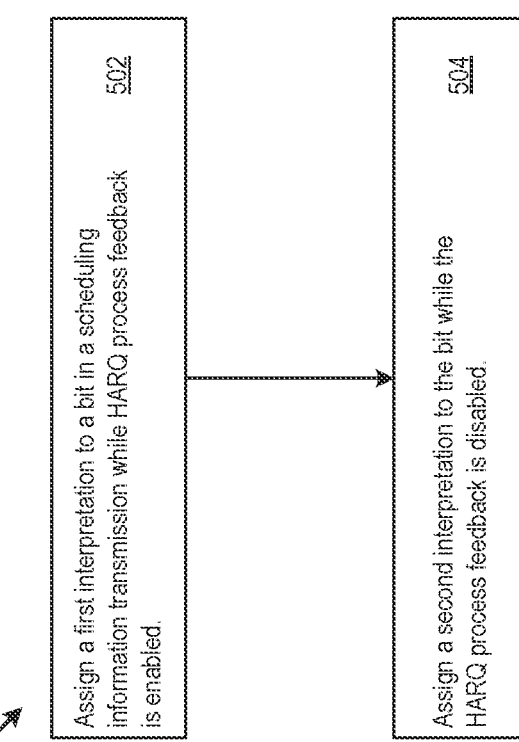

Referring now to FIG. 5, third example communication node logic 500 for a wireless communication node (or other basestation) and third example UE logic 550 for a UE is shown. The third example communication node logic 500 may assign a first interpretation to a bit in a scheduling information transmission at a time that HARQ process feedback is enabled (502). The third example communication node logic 500 may assign a second interpretation to the bit at a time that the HARQ process feedback is disabled (504). The first interpretation may be different from the second interpretation.

The third example UE logic 550 may interpret a bit in a scheduling information transmission according to a first interpretation (e.g., from a wireless communication node) at a time that HARQ process feedback is enabled (552). The third example UE logic 550 may interpret the bit according to a second interpretation at a time that the HARQ process feedback is disabled (554). The first interpretation may be different from the second interpretation.

For example, when the relationship between the indexes dynamically indicating the repetition number in the DCI and the repetition numbers can be specified in the radio standard, the relationship can be expressed as a mathematical formula. The methods, devices, processing, circuitry, and logic described above and below may be implemented in many different ways and in many different combinations of hardware and software. For example, all or parts of the implementations may be circuitry that includes an instruction processor, such as a Central Processing Unit (CPU), microcontroller, or a microprocessor, or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in tangible storage media that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on other machine-readable media. The media may be made-up of a single (e.g., unitary) storage device, multiple storage devices, a distributed storage device, or other storage configuration. A product, such as a computer program product, may include storage media and instructions stored in or on the media, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various examples are shown in Table 15.

TABLE 15

| Examples |
| --- |
| 1.     A method including:<br>transmitting, by a wireless communication node to a wireless communication<br>    device, transmission scheduling information;<br>where the transmission scheduling information includes a repetition-related<br>    parameter for data transmission scheduling.<br>2.     A method including:<br>transmitting, by a wireless communication node to a wireless communication<br>    device, downlink control information (DCI);<br>at a time that repeat-request process feedback is disabled, including, in the DCI, a<br>    repetition-related parameter to control data transmission scheduling; and<br>at a time that the repeat-request process feedback is enabled, omitting, from the<br>    DCI, the repetition-related parameter to control data transmission scheduling.<br>3.     A method including:<br>assigning a first interpretation to a bit in a scheduling information transmission at a<br>    time that hybrid auto repeat request (HARQ) process feedback is enabled; and<br>assigning a second interpretation to the bit at a time that the HARQ process<br>    feedback is disabled, the first interpretation different from the second<br>    interpretation.<br>4.     The method of example 3 or any of the other preceding examples, where<br>    assigning second interpretation to the bit includes a repetition-related parameter<br>    in the scheduling information using the bit.<br>5.     The method of any of the preceding examples, where the repetition-related<br>    parameter includes an indication of a number of repetitions, an aggregation<br>    factor, or both.<br>6.     The method of any of the preceding examples, where the scheduling<br>    information includes downlink control information (DCI).<br>7.     The method of any of the preceding examples, where one or more bits to<br>    indicate the repetition-related parameter is reinterpreted from a new data<br>    indicator, a redundancy version field, a modulation and coding scheme (MCS)<br>    field, a hybrid auto repeat request (HARQ) process number field, a downlink<br>    assignment index, a PDSCH-to-HARQ_feedback timing indicator, a bit within a |

TABLE 15-continued

Examples downlink control information (DCI) of format 0__0, a bit within a DCI of format 0__1,
a bit within a DCI of format 0__2, a bit within a DCI of format 1__0, a bit within a
DCI of format 1__1, a bit within a DCI of format 1__2, any bit from any DCI of any
format discussed in the specification or examples above, any bit from any field
discussed in the specification or examples above, or any combination thereof.

8.   The method of any of the preceding examples, where the repetition-related
parameter includes an indication of a number of repetitions, an indication of a
change to the number of repetitions, or an indication of that the number of
repetitions is unchanged.

9.   The method of example 8 or any of the other preceding examples, where
indicating a change to the number of repetitions includes providing an index
indicating a new number of repetitions, providing a flag indicating a relative
change to the number of repetitions, providing a flag guiding navigation through
a defined selection of numbers of repetitions, or any combination thereof.

10.   The method of example 8 or any of the other preceding examples, where
the repetition-related parameter indicates the number of repetitions by providing
an index indicating a number of repetitions.

11.   The method of example 10 or any of the other preceding examples, where
the index refers to a specific value within an expressed set.

12.   The method of example 11 or any of the other preceding examples, where
one value of the expressed set is assigned to each unique index.

13.   The method of example 11 or any of the other preceding examples, where
one value of the expressed set is assigned to unique tuples of indices.

14.   The method of example 11 or any of the other preceding examples, where
each value of the expressed set includes a positive integer, where:
optionally the values include, 2 repetitions, 8 repetitions, 32 repetitions, and 128
repetitions.

15.   The method of example 11 or any of the other preceding examples, where a
first value of the expressed set defines a number of repetitions when a hybrid
auto repeat request (HARQ) process feedback is enabled.

16.   The method of example 15 or any of the other preceding examples, where
the first value includes the lowest value of the expressed set.

17.   The method of example 15, example 16, or any of the other preceding
examples, where the any value of the expressed set indicated via the index
defines the number of repetitions when the HARQ process feedback is disabled.

18.   The method of any of examples 15-17 or any of the other preceding
examples, where one of a group of candidate values of the expressed set
defines the number of repetitions when the HARQ process feedback is disabled,
the candidate values including any value of the expressed set other than the first
value.

19.   The method of any of examples 11-18 or any of the other preceding
examples, where values of the expressed set are defined at least in part via
radio resource control (RRC) signaling, where:
optionally, the method includes sending an RRC information element (IE) that
defines the expressed set for when the HARQ process feedback is disabled, and
a repetition number for when the HARQ process feedback is enabled; and
optionally the method includes:
        sending a first RRC IE that defines the expressed set for when the HARQ
            process feedback is disabled; and
        sending a second RRC IE that defines repetition number for when the
            HARQ process feedback is enabled, the second RRC IE different from the
            first RRC IE.

20.   The method of any of examples 11-19 or any of the other preceding
examples, where values of the expressed set are defined at least in part using
default values.

21.   The method of example 10 or any of the other preceding examples, where:
the index refers to a specific value within a rule set; and
application of the index to one or more rules of the rule set provides the specific
value.

22.   The method of example 21 or any of the other preceding examples, where:
the one or more of the rules of the rule set include a mathematical formula; and
optionally, the index includes an argument that when applied to the mathematical
formula produces a corresponding value of the rule set.

23.   The method of example 21, example 22, or any of the other preceding
examples, where:
the one or more of the rules of the rule set include a minimum value for the rule
set, a maximum value for the rule set or both.

24.   The method of any of examples 21-23, or any of the other preceding
examples, where:
the one or more of the rules of the rule set include a step scaling factor for
determination of a ratio or difference between adjacent values of the rule set.

25.   The method of any of examples 21-24 or any of the other preceding
examples, where:
the one or more of the rules include a tuple of parameters, where:
optionally, the tuple of parameters includes minimum value for the rule set, a
maximum value for the rule set, a step scaling factor, or any combination thereof, TABLE 15-continued

---

Examples

--- where:
    optionally, the minimum value for the rule set also defines a number of
      repetitions when a hybrid auto repeat request (HARQ) process feedback
      is enabled; and
    optionally, the minimum value for the rule set is defined independently of
      the number of repetitions when the HARQ process feedback is enabled.
26.        The method of example 25 or any of the other preceding
  examples, where given the minimum value, the maximum value, and the step
  scaling factor, the mathematical formula is:
    Optionally:
      [repetition number] = [minimum value]*[step scaling factor]^[index],
when [minimum value]*[step scaling factor]^[index] <= [maximum value];
      [repetition number] = [maximum value], when [minimum
value]*[step scaling factor]^[index] > [maximum value].
27.    The method of any of examples 21-26 or any of the other preceding
  examples, where the one or more rules are defined at least in part by radio
  resource control (RRC) signaling, where:
optionally, the tuple is defined by sending an RRC information element including
  the tuple, where:
    optionally, the tuple includes a value indicating a number of repetitions
      when the HARQ process feedback is enabled, where:
      optionally, the value indicating a number of repetitions when the
        HARQ process feedback is enabled is defined independently of a
        minimum value for the rule set; and
optionally the method includes:
    sending a first RRC information element (IE) that at least in part defines the
      one or more rules for when the HARQ process is disabled; and
    sending a second RRC IE that defines repetition number for when the
      HARQ process is enabled, the second RRC IE different from the first RRC
      IE.
28.    The method of any of examples 21-27 or any of the other preceding
  examples, where the one more rules of the rules set are defined at least in part
  using default rules.
29.    The method of example 8 or any of the preceding examples, where the
  repetition-related parameter indicates the number of repetitions by providing a
  flag indicating a change in the number of repetitions, or that the number of
  repetitions remains unchanged.
30.    The method of example 29 or any of the other preceding examples, where
  the flag indicates whether the number of repetitions increases, decreases, or
  remains the same, where:
optionally, the flag includes a two-bit field, where:
    optionally:
      '00' indicates a decrease;
      '01' indicates that the repetition number stays the same; and
      '10' indicates an increase.
31.    The method of example 29, example 30, or any of the other preceding
  examples, where the flag indicates the increase in the number of repetitions by
  indicating a change from a current value within a rule set to a higher value within
  the rule set, where:
optionally, the change includes an incremental change to an adjacent value that is
  one step greater.
32.    The method of any of examples 29-31, or any of the other preceding
  examples, where the flag indicates the decrease in the number of repetitions by
  indicating a change from a current value within a rule set to a lower value within
  the rule set, where:
optionally, the change includes an incremental change to an adjacent value that is
  one step lower.
33.    The method of example 31, example 32, or any of the other preceding
  examples, where:
values within the rule set are defined indirectly by executing one or more rules of
  the rule set to generate the values.
34.    The method of example 33 or any of the other preceding examples, where
  the one or more of the rules of the rule set include a mathematical formula.
35.    The method of example 33, example 34, or any of the other preceding
  examples, where the one or more of the rules of the rule set include a minimum
  value for the rule set, a maximum value for the rule set or both.
36.    The method of any of examples 33-35 or any of the other preceding
  examples, where:
the one or more of the rules of the rule set include a step scaling factor for
  determination of a ratio or difference between adjacent values of the rule set.
37.    The method of any of examples 33-36 or any of the other preceding
  examples, where:
the one or more of the rules include a tuple of parameters, where:
optionally, the tuple of parameters includes minimum value for the rule set, a
  maximum value for the rule set, a step scaling factor, or any combination thereof, TABLE 15-continued

| Examples |
| --- | where:
    optionally, the minimum value for the rule set also defines a number of
      repetitions when a hybrid auto repeat request (HARQ) process feedback
      is enabled; and
    optionally, the minimum value for the rule set is defined independently of
      the number of repetitions when the HARQ process feedback is enabled.
38.     The method of any of examples 33-37 or any of the other preceding
  examples, where the one or more rules are defined at least in part by radio
  resource control (RRC) signaling, where:
optionally, the tuple is defined by sending an RRC information element including
  the tuple, where:
    optionally, the tuple includes a value indicating a number of repetitions
      when the HARQ process is enabled, where:
      optionally, the value indicating a number of repetitions when the
        HARQ process is enabled is defined independently of a minimum
        value for the rule set; and
optionally the method includes:
    sending a first RRC information element (IE) that at least in part defines the
      one or more rules for when the HARQ process is disabled; and
    sending a second RRC IE that defines repetition number for when the
      HARQ process is enabled, the second RRC IE different from the first RRC
      IE.
39.     The method of any of examples 33-38 or any of the other preceding
  examples, where the one or more rules of the rules set are defined at least in
  part using default rules.
40.     The method of example 29 or any of the other preceding examples, where
  the flag indicates a progression through an expressed set of values with a
  defined order.
41.     The method of example 40 or any of the other preceding examples, where
  the defined order defines one or more adjacent values for each value in the
  expressed set.
42.     The method of example 41 or any of the other preceding examples, where
  the adjacent values for each value in the express set include:
a value corresponding to an increase by an increment;
a value corresponding to a decrease by an increment; or
both.
43.     The method of any of examples 40-42 or any of the other preceding
  examples, where a first value of the expressed set defines a number of
  repetitions when a hybrid auto repeat request (HARQ) process feedback is
  enabled.
44.     The method of any of examples 40-43 or any of the other preceding
  examples, where the first value includes the lowest value of the expressed set.
45.     The method of any of examples 40-44 or any of the other preceding
  examples, where the any value of the expressed set that is indicated to be a
  current value as a result of the flag from the scheduling information defines the
  number of repetitions when the HARQ process feedback is disabled.
46.     The method of any of examples 40-44 or any of the other preceding
  examples, where one of a group of candidate values of the expressed set
  defines the number of repetitions when the HARQ process feedback is disabled,
  the candidate values including any value of the expressed set other than the first
  value.
47.     The method of any of examples 40-46 or any of the other preceding
  examples, where values of the expressed set are defined at least in part via
  radio resource control (RRC) signaling, where:
optionally, the method includes sending an RRC information element (IE) that
  defines the expressed set for when the HARQ process feedback is disabled, and
  a repetition number for when the HARQ process feedback is enabled; and
optionally the method includes:
    sending a first RRC IE that defines the expressed set for when the HARQ
      process feedback is disabled; and
    sending a second RRC IE that defines repetition number for when the
      HARQ process feedback is enabled, the second RRC IE different from the
      first RRC IE.
48.     The method of any of examples 40-47 or any of the other preceding
  examples, where values of the expressed set are defined at least in part using
  default values.
49.     The method of any of the preceding examples, where the repetition-related
  parameter is activated when a repeat request process feedback is disabled.
50.     The method of example 49 or any of the other preceding examples, where
  the repeat request process includes a hybrid auto repeat request (HARQ)
  process.
51.     The method of example 49, example 50, or any of the other preceding
  examples, where the repeat request process feedback is enabled or disabled by
  signaling at the radio resource control layer.
52.     A wireless communication node including circuitry configured to perform
  any of the methods of examples 1-51.

TABLE 15-continued

Examples

53.     A method including:
receiving, at a mobile device, the transmission scheduling information and/or
    downlink control information (DCI) defined in any of examples 1-53, where:
optionally, the method includes decoding the scheduling information and/or DCI;
    and
optionally, the method include altering a repetition parameter setting based on the
    scheduling information and/or DCI.
54.     A method including:
receiving, by a wireless communication device from a wireless communication
    node, transmission scheduling information;
where the transmission scheduling information includes a repetition-related
    parameter for data transmission scheduling.
55.     A method including:
receiving, by a wireless communication device from a wireless communication
    node, downlink control information (DCI);
at a time that repeat-request process feedback is disabled, obtaining, from the
    DCI, a repetition-related parameter to control data transmission scheduling,
    where:
optionally, when the repetition-related parameter is present in the DCI at a time
    that the repeat-request process feedback is enabled, ignoring the repetition-
    related parameter.
56.     A method including:
interpreting, according to a first interpretation, a bit in a scheduling information
    transmission at a time that hybrid auto repeat request (HARQ) process feedback
    is enabled; and
interpreting, according to a second interpretation, the bit at a time that the HARQ
    process feedback is disabled, the first interpretation different from the second
    interpretation.
57.     The method of example 56 or any of examples 54-55, where interpreting
    the bit according to the second interpretation includes obtaining a repetition-
    related parameter from the scheduling information using the bit.
58.     The method of any of examples 54-57, where the repetition-related
    parameter includes an indication of a number of repetitions, an aggregation
    factor, or both.
59.     The method of any of examples 54-58, where the scheduling information
    includes downlink control information (DCI).
60.     The method of any of examples 54-59, where one or more bits to indicate
    the repetition-related parameter is reinterpreted from a new data indicator, a
    redundancy version field, a hybrid auto repeat request (HARQ) process number
    field, a downlink assignment index, a PDSCH-to-HARQ_feedback timing
    indicator, a bit within a downlink control information (DCI) of format 0_0, a bit
    within a DCI of format 0_1, a bit within a DCI of format 0_2, a bit within a DCI of
    format 1_0, a bit within a DCI of format 1_1, a bit within a DCI of format 1_2, any
    bit from any DCI of any format discussed in the specification or examples above,
    any bit from any field discussed in the specification or examples above, or any
    combination thereof.
61.     The method of any of examples 54-60, where the repetition-related
    parameter includes an indication of a number of repetitions, an indication of a
    change to the number of repetitions, or an indication that the number of
    repetitions is unchanged.
62.     The method of example 61 or any of examples 54-60, where determining a
    change to the number of repetitions includes receiving an index indicating a new
    number of repetitions, receiving a flag indicating a relative change to the number
    of repetitions, receiving a flag guiding navigation through a defined selection of
    numbers of repetitions, or any combination thereof.
63.     The method of example 61 or any of examples 54-60 and 62, where the
    repetition-related parameter indicates the number of repetitions by providing an
    index indicating a number of repetitions.
64.     The method of example 63 or any of examples 54-62, where the index
    refers to a specific value within an expressed set.
65.     The method of example 64 or any of examples 54-63, where one value of
    the expressed set is assigned to each unique index.
66.     The method of example 64 or any of examples 54-63 and 65, where one
    value of the expressed set Is assigned to unique tuples of indices.
67.     The method of example 64 or any of examples 54-63, 65, and 66, where
    each value of the expressed set includes a positive integer, where:
optionally the values include, 2 repetitions, 8 repetitions, 32 repetitions, and 128
    repetitions.
68.     The method of example 64 or any of examples 54-63, and 65-67, where a
    first value of the expressed set defines a number of repetitions when a hybrid
    auto repeat request (HARQ) process feedback is enabled.
69.     The method of example 68 or any of examples 54-67, where the first value
    includes the lowest value of the expressed set.
70.     The method of example 68, example 69, or any of examples 54-67, where
    the any value of the expressed set indicated via the index defines the number of
    repetitions when the HARQ process feedback is disabled.
71.     The method of any of examples 68-70 or any of examples 54-67, where one
    of a group of candidate values of the expressed set defines the number of TABLE 15-continued Examples repetitions when the HARQ process feedback is disabled, the candidate values
including any value of the expressed set other than the first value.
72.      The method of any of examples 64-71 or any of examples 54-63, where
values of the expressed set are defined at least in part via radio resource control
(RRC) signaling, where:
optionally, the method includes receiving an RRC information element (IE) that
   defines the expressed set for when the HARQ process feedback is disabled, and
   a repetition number for when the HARQ process feedback is enabled; and
optionally the method includes:
       receiving a first RRC IE that defines the expressed set for when the HARQ
          process feedback is disabled; and
       receiving a second RRC IE that defines repetition number for when the
          HARQ process feedback is enabled, the second RRC IE different from the
          first RRC IE.
73.      The method of any of examples 64-72 or any of examples 54-63, where
values of the expressed set are defined at least in part using default values.
74.      The method of example 63 or any of examples 54-62 and 64-73, where:
the index refers to a specific value within a rule set; and
application of the index to one or more rules of the rule set provides the specific
   value.
75.      The method of example 74 or any of examples 54-73, where:
the one or more of the rules of the rule set include a mathematical formula; and
optionally, the index includes an argument that when applied to the mathematical
   formula produces a corresponding value of the rule set.
76.      The method of example 74, example 75, or any of examples 54-73, where:
the one or more of the rules of the rule set include a minimum value for the rule
   set, a maximum value for the rule set or both.
77.      The method of example any of examples 74-76, or any of examples 54-73,
   where:
the one or more of the rules of the rule set include a step scaling factor for
   determination of a ratio or difference between adjacent values of the rule set.
78.      The method of any of examples 74-77 or any of examples 54-73, where:
the one or more of the rules include a tuple of parameters, where:
optionally, the tuple of parameters includes minimum value for the rule set, a
   maximum value for the rule set, a step scaling factor, or any combination thereof,
   where:
       optionally, the minimum value for the rule set also defines a number of
          repetitions when a hybrid auto repeat request (HARQ) process feedback
          is enabled; and
       optionally, the minimum value for the rule set is defined independently of
          the number of repetitions when the HARQ process feedback is enabled.
79.      The method of example 78 or any of examples 54-77, where given the
   minimum value, the maximum value, and the step scaling factor, where:
optionally, the mathematical formula is:
       [repetition number] = [minimum value]*[step scaling factor]^[index], when
          [minimum value]*[step scaling factor]^[index] <= [maximum value];
       [repetition number] = [maximum value], when [minimum value]*[step scaling
          factor]^[index] > [maximum value].
80.      The method of any of examples 74-79 or any of examples 54-73, where the
   one or more rules are defined at least in part by radio resource control (RRC)
   signaling, where:
optionally, the tuple is defined by sending an RRC information element including
   the tuple, where:
       optionally, the tuple includes a value indicating a number of repetitions
          when the HARQ process feedback is enabled, where:
          optionally, the value indicating a number of repetitions when the
             HARQ process feedback is enabled is defined independently of a
             minimum value for the rule set; and
optionally the method includes:
       receiving a first RRC information element (IE) that at least in part defines
          the one or more rules for when the HARQ process is disabled; and
       receiving a second RRC IE that defines repetition number for when the
          HARQ process is enabled, the second RRC IE different from the first RRC
          IE.
81.      The method of any of examples 74-80 or any of examples 54-73, where the
   one more rules of the rules set are defined at least in part using default rules.
82.      The method of example 61 or any examples 54-60 and 62-81, where the
   repetition-related parameter indicates the number of repetitions by receiving a
   flag indicating a change in the number of repetitions, or that the number of
   repetitions remains unchanged.
83.      The method of example 82 or any of examples 54-81, where the flag
   indicates whether the number of repetitions increases, decreases, or remains the
   same, where:
optionally, the flag includes a two-bit field, where:
       optionally:
          '00' indicates a decrease;
          '01' indicates that the repetition number stays the same; and
          '10' indicates an increase.

TABLE 15-continued

Examples

84.    The method of example 82, example 83, or any of examples 54-81, where
the flag indicates the increase in the number of repetitions by indicating a change
from a current value within a rule set to a higher value within the rule set, where:
optionally, the change includes an incremental change to an adjacent value that is
one step greater.
85.    The method of any of examples 82-84, or any of examples 54-81, where the
flag indicates the decrease in the number of repetitions by indicating a change
from a current value within a rule set to a lower value within the rule set, where:
optionally, the change includes an incremental change to an adjacent value that is
one step lower.
86.    The method of example 84, example 85, or any of examples 54-83, where:
values within the rule set are defined indirectly by executing one or more rules of
the rule set to generate the values.
87.    The method of example 86 or any of examples 54-85, where the one or
more of the rules of the rule set include a mathematical formula.
88.    The method of example 86, example 87, or any of examples 54-85, where
the one or more of the rules of the rule set include a minimum value for the rule
set, a maximum value for the rule set or both.
89.    The method of any of examples 86-88 or any of examples 54-85, where:
the one or more of the rules of the rule set include a step scaling factor for
determination of a ratio or difference between adjacent values of the rule set.
90.    The method of any of examples 86-89 or any of examples 54-85, where:
the one or more of the rules include a tuple of parameters, where:
optionally, the tuple of parameters includes minimum value for the rule set, a
maximum value for the rule set, a step scaling factor, or any combination thereof,
where:
        optionally, the minimum value for the rule set also defines a number of
            repetitions when a hybrid auto repeat request (HARQ) process feedback
            is enabled; and
        optionally, the minimum value for the rule set is defined independently of
            the number of repetitions when the HARQ process feedback is enabled.
91.    The method of any of examples 86-90 or any of examples 54-85, where the
one or more rules are defined at least in part by radio resource control (RRC)
signaling, where:
optionally, the tuple is defined by sending an RRC information element including
the tuple, where:
        optionally, the tuple includes a value indicating a number of repetitions
            when the HARQ process is enabled, where:
            optionally, the value indicating a number of repetitions when the
                HARQ process is enabled is defined independently of a minimum
                value for the rule set; and
optionally the method includes:
        receiving a first RRC information element (IE) that at least in part defines
            the one or more rules for when the HARQ process is disabled; and
        receiving a second RRC IE that defines repetition number for when the
            HARQ process is enabled, the second RRC IE different from the first RRC
            IE.
92.    The method of any of examples 86-91 or any of examples 54-85, where the
one or more rules of the rules set are defined at least in part using default rules.
93.    The method of example 82 or any of examples 54-81 and 83-92, where the
flag indicates a progression through an expressed set of values with a defined
order.
94.    The method of example 93 or any of examples 54-92, where the defined
order defines one or more adjacent values for each value in the expressed set.
95.    The method of example 94 or any of examples 54-93, where the adjacent
values for each value in the express set include:
a value corresponding to an increase by an increment;
a value corresponding to a decrease by an increment; or
both.
96.    The method of any of examples 93-95 or any of examples 54-92, where a
first value of the expressed set defines a number of repetitions when a hybrid
auto repeat request (HARQ) process feedback is enabled.
97.    The method of any of examples 93-96 or any of examples 54-92, where the
first value includes the lowest value of the expressed set.
98.    The method of any of examples 93-97 or any of examples 54-92, where the
any value of the expressed set that is indicated to be a current value as a result
of the flag from the scheduling information defines the number of repetitions
when the HARQ process feedback is disabled.
99.    The method of any of examples 93-97 or any of examples 54-92, where one
of a group of candidate values of the expressed set defines the number of
repetitions when the HARQ process feedback is disabled, the candidate values
including any value of the expressed set other than the first value.
100.    The method of any of examples 93-99 or any of examples 54-92, where
values of the expressed set are defined at least in part via radio resource control
(RRC) signaling, where:
optionally, the method includes receiving an RRC information element (IE) that
defines the expressed set for when the HARQ process feedback is disabled, and
a repetition number for when the HARQ process feedback is enabled; and TABLE 15-continued Examples optionally the method includes:
        receiving a first RRC IE that defines the expressed set for when the HARQ
           process feedback is disabled; and
        receiving a second RRC IE that defines repetition number for when the
           HARQ process feedback is enabled, the second RRC IE different from the
           first RRC IE.
101.      The method of any of examples 93-100 or any of examples 54-92, where
    values of the expressed set are defined at least in part using default values.
102.      The method of any examples 54-101, where the repetition-related
    parameter is activated when a repeat request process feedback is disabled.
103.      The method of example 102 or any of examples 54-101, where the repeat
    request process includes a hybrid auto repeat request (HARQ) process.
104.      The method of example 102, example 103, or any of examples 54-101, the
    repeat request process feedback Is enabled or disabled by signaling at the radio
    resource control layer.
105.      The method of any of the preceding examples, where the scheduling
    information includes downlink control information (DCI), radio resource control
    (RRC) signaling or both.
106.      A mobile device including circuitry configured to perform the method of any
    of examples example 53-105.

Various implementations have been specifically described. However, many other implementations are also possible.

What is claimed is:

1. A method including:

transmitting, by a wireless communication node to a wireless communication device, transmission scheduling information;

where the transmission scheduling information includes repetition-related and/or HARQ-related parameters for data transmission scheduling, the repetition-related and/or HARQ-related parameters have one of different interpretations conditioned on whether a hybrid auto repeat request (HARQ) process feedback is disabled or enabled, or whether maximum supported HARQ process number exceeds a threshold, a first interpretation is assigned to a bit in a scheduling information transmission at a time that the HARQ process feedback is enabled; and a second interpretation is assigned to the bit at a time that the HARQ process feedback is disabled, the first interpretation is different from the second interpretation, a third interpretation is assigned to a bit in a scheduling information transmission at a time that maximum supported HARQ process number is smaller than a threshold, and a fourth interpretation is assigned to the bit at a time that maximum supported HARQ process number exceed a threshold, the third interpretation is different from the fourth interpretation.

2. The method of claim 1, where the scheduling information includes downlink control information (DCI), radio resource control (RRC) signaling or both.

3. The method of claim 2, where repetition-related parameters are defined in radio resource control (RRC) signaling, where the method further includes:

sending a RRC information element (IE) that defines a repetition number for when the HARQ process feedback is disabled, and a repetition number for when the HARQ process feedback is enabled; and sending a first RRC IE that defines the repetition number for when the HARQ process feedback is disabled; and sending a second RRC IE that defines repetition number for when the HARQ process feedback is enabled, the second RRC IE different from the first RRC IE.

4. The method of claim 2, where the downlink control information (DCI) includes a repetition-related parameter to control data transmission scheduling at a time that repeat-request process feedback is disabled; and excludes the repetition-related parameter to control data transmission scheduling at a time that the repeat-request process feedback is enabled.

5. The method of claim 1, where one or more bits to indicate the repetition-related parameter is reinterpreted from a new data indicator, a redundancy version field, a hybrid auto repeat request (HARQ) process number field, a modulation and coding scheme field (MCS), a downlink assignment index, a PDSCH-to-HARQ_feedback timing indicator, a bit within a downlink control information (DCI) of format 0_0, a bit within a DCI of format 0_1, a bit within a DCI of format 0_2, a bit within a DCI of format 1_0, a bit within a DCI of format 1_1, a bit within a DCI of format 1_2, any bit from any DCI of any format discussed in the specification or claims above, any bit from any field discussed in the specification or claims above, or any combination thereof.

6. The method of claim 1, in addition to a hybrid auto repeat request (HARQ) process number field, where one or more bits from a new data indicator, a redundancy version field, a modulation and coding scheme field (MCS), a downlink assignment index, a PDSCH-to-HARQ_feedback timing indicator, or any combination thereof, is reinterpreted to indicate the HARQ-related parameter.

7. The method of claim 1, where the repetition-related parameter includes an indication of a number of repetitions, an indication of a change to the number of repetitions, or an indication of that the number of repetitions is unchanged.

8. The method of claim 7, where the repetition-related parameter indicates the number of repetitions by providing an index indicating a number of repetitions.

9. The method of claim 1, where values of expressed set are defined at least in part via radio resource control (RRC) signaling, where the method further includes:

sending an RRC information element (IE) that defines the expressed set for when the HARQ process feedback is disabled, and a repetition number for when the HARQ process feedback is enabled;

sending a first RRC IE that defines the expressed set for when the HARQ process feedback is disabled; and sending a second RRC IE that defines repetition number for when the HARQ process feedback is enabled, the second RRC IE different from the first RRC IE.

10. A method including:

receiving, at a mobile device, transmission scheduling information decoding scheduling information; and the method include altering a repetition-related and/or HARQ-related parameter setting based on the scheduling information;

where a bit in a scheduling information transmission is interpreted according to a first interpretation at a time that maximum supported HARQ process number is smaller than a threshold; and the bit is interpreted according to a second interpretation at a time that maximum supported HARQ process number exceed a threshold, the first interpretation different from the second interpretation.

11. The method of claim 10, where the scheduling information includes downlink control information (DCI), radio resource control (RRC) signalling or both.

12. The method of claim 11, where repetition-related parameters are defined in radio resource control (RRC) signaling, a bit in a scheduling information transmission is interpreted according to a first interpretation at a time that hybrid auto repeat request (HARQ) process feedback is enabled; and the bit is interpreted according to a second interpretation at a time that the HARQ process feedback is disabled, where the method further includes:

receiving a RRC information element (IE) that defines a repetition number for when the HARQ process feedback is disabled, and a repetition number for when the HARQ process feedback is enabled;

receiving a first RRC IE that defines the repetition number for when the HARQ process feedback is disabled; and receiving a second RRC IE that defines repetition number for when the HARQ process feedback is enabled, the second RRC IE different from the first RRC IE.

13. The method of claim 12, where the downlink control information (DCI) includes a repetition-related parameter to control data transmission scheduling at a time that repeat-request process feedback is disabled, and excludes a repetition-related parameter to control data transmission scheduling at a time that the repeat-request process feedback is enabled.

14. The method of claim 13, where one or more bits to indicate the repetition-related parameter is reinterpreted from a new data indicator, a redundancy version field, a hybrid auto repeat request (HARQ) process number field, a modulation and coding scheme field (MCS), a downlink assignment index, a PDSCH-to-HARQ_feedback timing indicator, a bit within a downlink control information (DCI) of format 0_0, a bit within a DCI of format 0_1, a bit within a DCI of format 0_2, a bit within a DCI of format 1_0, a bit within a DCI of format 1_1, a bit within a DCI of format 1_2, any bit from any DCI of any format discussed in the specification or claims above, any bit from any field discussed in the specification or claims above, or any combination thereof.

15. The method of claim 13, where values of expressed set are defined at least in part via radio resource control (RRC) signaling, where the method further includes:

receiving an RRC information element (IE) that defines the expressed set for when the HARQ process feedback is disabled, and a repetition number for when the HARQ process feedback is enabled;

receiving a first RRC IE that defines the expressed set for when the HARQ process feedback is disabled; and receiving a second RRC IE that defines repetition number for when the HARQ process feedback is enabled, the second RRC IE different from the first RRC IE.

16. A mobile device comprises:

a memory operable to store computer-readable instructions; and a processor circuitry operable to read the computer-readable instructions, the processor circuitry when executing the computer-readable instructions is configured to:

receive transmission scheduling information, where the transmission scheduling information includes repetition-related and/or HARQ-related parameters for data transmission scheduling, the repetition-related and/or HARQ-related parameters have one of different interpretations conditioned on whether a hybrid auto repeat request (HARQ) process feedback is disabled or enabled, or whether maximum supported HARQ process number exceeds a threshold, a first interpretation is assigned to a bit in a scheduling information transmission at a time that the HARQ process feedback is enabled; and a second interpretation is assigned to the bit at a time that the HARQ process feedback is disabled, the first interpretation different from the second interpretation, a third interpretation is assigned to a bit in a scheduling information transmission at a time that maximum supported HARQ process number is smaller than a threshold, and a fourth interpretation is assigned to the bit at a time that maximum supported HARQ process number exceed a threshold, the third interpretation is different from the fourth interpretation;

decode the scheduling information; and alter a repetition-related and/or HARQ-related parameter setting based on the scheduling information.

* * * * *